US012801327B2

(12) United States Patent
Yun et al.

(10) Patent No.: US 12,801,327 B2
(45) Date of Patent: Nov. 17, 2026

(54) ELECTRONIC APPARATUS AND METHOD FOR CONTROLLING THE SAME

(71) Applicant: SAMSUNG ELECTRONICS CO., LTD., Suwon-si (KR)

(72) Inventors: Seongjin Yun, Suwon-si (KR); Seha Park, Suwon-si (KR); Jiho Kim, Suwon-si (KR); Hyungi Na, Suwon-si (KR); Hyeseung Do, Suwon-si (KR); Sungjae Lee, Suwon-si (KR); Hyeju Han, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 0 days.

(21) Appl. No.: 19/247,809

(22) Filed: Jun. 24, 2025

(65) Prior Publication Data

US 2026/0029979 A1 Jan. 29, 2026

Related U.S. Application Data

(63) Continuation of application No. PCT/KR2025/095285, filed on Apr. 23, 2025.

(30) Foreign Application Priority Data

Jul. 24, 2024 (KR) ........................ 10-2024-0098182

(51) Int. Cl.

| | |
|---|---|
| ***G06F 3/14*** | (2006.01) |
| ***G06F 3/147*** | (2006.01) |
| ***G09G 3/32*** | (2016.01) |

(52) U.S. Cl.

CPC ............ *G06F 3/1446* (2013.01); *G06F 3/147* (2013.01); *G09G 3/32* (2013.01);

(Continued)

(58) Field of Classification Search

CPC ......... G06F 3/1446; G06F 3/147; G09G 3/32; G09G 2300/026; G09G 2340/0407; G09G 2360/04

See application file for complete search history.

(56) References Cited

U.S. PATENT DOCUMENTS

| | | | |
|---|---|---|---|
| 10,152,292 | B2 | 12/2018 | Yang |
| 11,163,516 | B2 | 11/2021 | Son et al. |

(Continued)

FOREIGN PATENT DOCUMENTS

| | | | |
|---|---|---|---|
| CN | 113645711 | A | 11/2021 |
| KR | 10-2011-0024273 | A | 3/2011 |

(Continued)

OTHER PUBLICATIONS

International Search Report and Written Opinion dated Jul. 24, 2025, issued by the International Searching Authority in International Application No. PCT/KR2025/095285.

*Primary Examiner* — Robert J Michaud

(74) *Attorney, Agent, or Firm* — Sughrue Mion, PLLC

(57) ABSTRACT

An electronic apparatus configured to communicate with a plurality of display devices, may include: a communication device including a plurality of first communication interfaces at different positions on the electronic apparatus; memory storing at least one instruction; and at least one processor configured to execute the at least one instruction, wherein the at least one instruction, when executed by the at least one processor individually or collectively, cause the electronic device to: control the plurality of first communication interfaces to acquire distance information between the plurality of first communication interfaces and the plurality of display devices; acquire arrangement information of the plurality of display devices based on the distance informa- (Continued)

tion; and control the plurality of display devices to display an image based on the arrangement information.

18 Claims, 20 Drawing Sheets

(52) U.S. Cl.
CPC ................. *G09G 2300/026* (2013.01); *G09G 2340/0407* (2013.01); *G09G 2360/04* (2013.01)

(56) References Cited

U.S. PATENT DOCUMENTS

| | | | | |
|---|---|---|---|---|
| 11,317,072 | B2 | 4/2022 | Kim et al. | |
| 11,972,168 | B2 | 4/2024 | Yi et al. | |
| 2017/0262246 | A1 | 9/2017 | Guo | |
| 2020/0348898 | A1* | 11/2020 | Son | H04N 21/426 |
| 2023/0015655 | A1 | 1/2023 | Wang et al. | |

FOREIGN PATENT DOCUMENTS

| | | | | | |
|---|---|---|---|---|---|
| KR | 20110024273 | A | * | 3/2011 | H04N 5/44 |
| KR | 10-2016-0131851 | A | | 11/2016 | |
| KR | 20160131851 | A | * | 11/2016 | B60R 25/102 |
| KR | 10-2017-0111145 | A | | 10/2017 | |
| KR | 10-2017-0135787 | A | | 12/2017 | |
| KR | 10-2019-0018919 | A | | 2/2019 | |
| KR | 10-2019-0053032 | A | | 5/2019 | |
| KR | 10-2373465 | B1 | | 3/2022 | |
| KR | 10-2023-0063716 | A | | 5/2023 | |

* cited by examiner

ELECTRONIC APPARATUS AND METHOD FOR CONTROLLING THE SAME

CROSS-REFERENCE TO RELATED APPLICATIONS

This application is a continuation of International Application No. PCT/KR2025/095285 designating the United States, filed on Apr. 23, 2025, in the Korean Intellectual Property Receiving Office and claiming priority to Korean Patent Application No. 10-2024-0098182, filed on Jul. 24, 2024, in the Korean Intellectual Property Office, the disclosures of each of which are incorporated by reference herein in their entireties.

BACKGROUND

1. Field

The present disclosure relates to an electronic apparatus and a method for controlling the same, and more particularly, to an electronic apparatus for identifying a position of each of a plurality of display devices included in an external display group, and a method for controlling the same.

2. Description of Related Art

Recently, a light-emitting diode (LED) modular display that provides an expanded display screen by coupling a plurality of LED display modules has been increasingly used. The LED modular display may be implemented by connecting the plurality of LED modules, and provide visual satisfaction to a user by displaying a high-resolution image on a large screen.

A process for identifying a position of each display module needs to be followed to enable such an LED modular display to output the high-resolution image. However, to identify the position of the display module, the user has to visually check the position of each module with the naked eye and manually align the position of each module by using a separate control device, which is inconvenient. In addition, if the position of each display module is identified using upper, lower, left, and right docking terminals disposed in each display module, the user may not identify each position in case that the respective display modules are spaced apart from each other.

This problem leads to an emerging need for a technology for identifying the positions of the plurality of display modules included in the LED modular display in a wireless manner.

SUMMARY

According to an aspect of the disclosure, an electronic apparatus configured to communicate with a plurality of display devices, may include: a communication device including a plurality of first communication interfaces at different positions on the electronic apparatus; memory storing at least one instruction; and at least one processor configured to execute the at least one instruction, wherein the at least one instruction, when executed by the at least one processor individually or collectively, cause the electronic device to: control the plurality of first communication interfaces to acquire distance information between the plurality of first communication interfaces and the plurality of display devices; and acquire arrangement information of the plurality of display devices based on the distance information.

The at least one instruction, when executed by the at least one processor individually or collectively, may cause the electronic apparatus to acquire position information of the plurality of display devices based on the distance information.

The at least one instruction, when executed by the at least one processor individually or collectively, may cause the electronic apparatus to: control the plurality of first communication interfaces to acquire distance information between the plurality of first communication interfaces and a plurality of second communication interfaces respectively in the plurality of display devices; and acquire position information of the plurality of second communication interfaces based on the distance information.

The position information may include coordinate values. The at least one instruction, when executed by the at least one processor individually or collectively, may cause the electronic apparatus to: calculate the coordinate values based on the distance information; and acquire difference values of the coordinate values by comparing the coordinate values.

The memory may further store mount information including positions of the second communication interfaces in the plurality of display devices. The at least one instruction, when executed by the at least one processor individually or collectively, may cause the electronic apparatus to acquire whether the plurality of display devices are adjacent to or spaced apart from at least one neighboring display device based on the mount information and the difference values.

The memory may further store size information of the plurality of display devices. The at least one instruction, when executed by the at least one processor individually or collectively, may cause the electronic apparatus to acquire whether the plurality of display devices is adjacent to or spaced apart from the at least one neighboring display device based on the mount information, the size information, and the difference values.

The at least one instruction, when executed by the at least one processor individually or collectively, may cause the electronic apparatus to provide the arrangement information to the plurality of display devices via the communication device.

The at least one instruction, when executed by the at least one processor individually or collectively, may cause the electronic apparatus to provide a signal corresponding to an image, along with the arrangement information, to the plurality of display devices.

The memory mat further store the image. The at least one instruction, when executed by the at least one processor individually or collectively, may cause the electronic apparatus to: identify a plurality of partial images respectively corresponding to the plurality of display devices from the image based on the arrangement information; and provide signals corresponding to the plurality of partial images to the plurality of display devices via the communication device.

The memory may further store resolution information and size information of the plurality of display devices. The at least one instruction, when executed by the at least one processor individually or collectively, may cause the electronic device to: identify pixel pitches of the plurality of display devices based on the resolution information and the size information of the plurality of display devices; downsample remaining partial images, excluding a partial image corresponding to a display device having a maximum pixel pitch, among the plurality of partial images, based on a pixel pitch difference of the pixel pitches; and provide the downsampled partial image and remaining partial images to the plurality of display devices, respectively.

According to an aspect of the disclosure, a method of controlling an electronic apparatus configured to communicate with a plurality of display devices, may include: controlling a plurality of first communication interfaces at different positions on the electronic apparatus to acquire distance information between the plurality of first communication interfaces and the plurality of display devices; and acquiring arrangement information of the plurality of display devices based on the distance information.

The acquiring the arrangement information of the plurality of display devices may include acquiring position information of the plurality of display devices based on the distance information.

The electronic apparatus includes the plurality of first communication interfaces at the different positions on the electronic device. The controlling of the plurality of first communication interfaces may include controlling the plurality of first communication interfaces to acquire distance information between the plurality of first communication interfaces and a plurality of second communication interfaces respectively included in the plurality of display devices. The acquiring the position information may include acquiring the position information of the plurality of second communication interfaces based on the distance information.

The position information may include coordinate values. The acquiring the position information of the plurality of second communication interfaces may include calculating the coordinate values based on the distance information; and acquiring difference values of the coordinate values by comparing the coordinate values.

The acquiring the position information of the plurality of second communication interfaces may include acquiring whether the plurality of display devices are adjacent to or spaced apart from at least one neighboring display device based on mount information including positions of the second communication interfaces in the plurality of display devices, and the difference values.

The acquiring whether the plurality of display devices are adjacent to or spaced apart from at least one neighboring display device may include acquiring whether the plurality of display devices is adjacent to or spaced apart from the at least one neighboring display device based on the mount information, size information of the plurality of display devices, and the difference values.

The method may further include providing the arrangement information to the plurality of display devices.

The method may further include providing a signal corresponding to an image, along with the arrangement information, to the plurality of display devices.

The method may further include: identifying a plurality of partial images respectively corresponding to the plurality of display devices from an image based on the arrangement information; and providing signals corresponding to the plurality of partial images to the plurality of display devices.

The providing signals corresponding to the plurality of partial images to the plurality of display devices may include identifying pixel pitches of the plurality of display devices based on resolution information and size information of the plurality of display devices; downsampling remaining partial images, excluding a partial image corresponding to a display device having a maximum pixel pitch, among the plurality of partial images, based on a pixel pitch difference of the pixel pitches; and providing the downsampled partial image and remaining partial images to the plurality of display devices, respectively.

BRIEF DESCRIPTION OF THE DRAWINGS

The above and other aspects, features, and advantages of certain embodiments of the present disclosure will be more apparent from the following description taken in conjunction with the accompanying drawings, in which.

DETAILED DESCRIPTION

Figure 1:
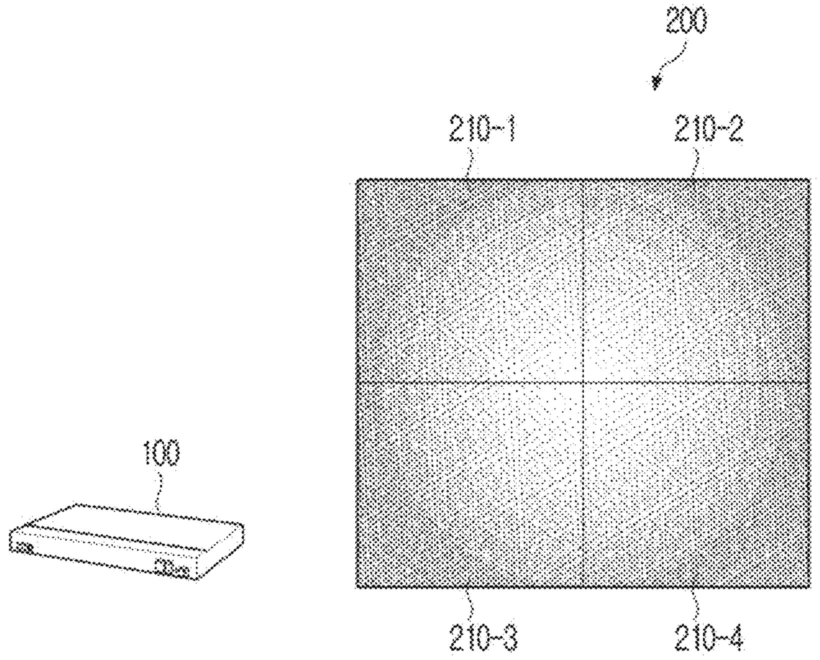
FIG. 1 is a diagram for describing operations of an electronic apparatus and a plurality of display devices according to one or more embodiments of the present disclosure.

The present disclosure may be variously modified and have several embodiments, and specific embodiments of the present disclosure are thus shown in the drawings and described in detail in the detailed description. However, it should be understood that the scope of the present disclosure is not limited to the specific embodiments, and includes various modifications, equivalents and/or alternatives according to the embodiments of the present disclosure. Throughout the accompanying drawings, similar components are denoted by similar reference numerals.

In describing the present disclosure, omitted is a detailed description of a case where it is decided that a detailed description of the known functions or configurations related to the present disclosure may unnecessarily obscure the gist of the present disclosure.

In addition, the following embodiments may be modified in several different forms, and the scope and spirit of the present disclosure are not limited to the following embodiments. Rather, these embodiments are provided to make the present disclosure thorough and complete, and completely transfer the spirit of the present disclosure to those skilled in the art.

Terms used in the present disclosure are used only to describe the specific embodiments rather than limit the scope of the present disclosure. A term of a singular number may include its plural number unless explicitly indicated otherwise in the context.

In the present disclosure, the expression "have", "may have", "include", "may include" or the like, indicates the presence of a corresponding feature (for example, a numerical value, a function, an operation, or a component such as a part), and does not exclude the presence of an additional feature.

In the present disclosure, the expression "A or B", "least one of A and/or B" or "one or more of A and/or B" or the like, may include all possible combinations of items enumerated together. For example, the expression "at least one of a, b or c" indicates only a, only b, only c, both a and b, both a and c, both b and c, or all of a, b, and c.

The expressions "first", "second" and the like, used in the present disclosure may indicate various components regardless of a sequence and/or importance of the components. These expressions are only used to distinguish one component from another component and do not limit the corresponding components.

If any component (for example, a first component) is mentioned to be "(operatively or communicatively) coupled with/to" or "connected to" another component (for example, a second component), it should be understood that the any component is directly coupled to another component or may be coupled to another component through yet another component (for example, a third component).

On the other hand, if any component (for example, the first component) is mentioned to be "directly coupled with/to" or "directly connected to" another component (for example, the second component), it should be understood that yet another component (for example, the third component) is not present between any component and another component.

An expression "configured (or set) to" used in the present disclosure may be replaced by an expression "suitable for", "having the capacity to", "designed to", "adapted to", "made to", or "capable of" based on a context. A term "configured (or set) to" may not necessarily indicate "specifically designed to" in hardware.

Instead, an expression a "apparatus configured to" in any context may indicate that the apparatus may "perform-" along with another apparatus or component. For example, a "processor configured (or set) to perform A, B, and C" may indicate a dedicated processor (for example, an embedded processor) that may perform the corresponding operations or a general-purpose processor (for example, a central processing unit (CPU) or an application processor) that may perform the corresponding operations by executing one or more software programs stored in a memory device.

In the embodiments, a "module" or a "~er/or" may perform at least one function or operation, and be implemented by hardware or software or be implemented by a combination of hardware and software. In addition, a plurality of "modules" or a plurality of "~ers/ors" may be integrated in at least one module and be implemented by at least one processor except for a "module" or an "~er/or" that needs to be implemented by specific hardware.

Meanwhile, the various elements and regions in the drawings are schematically shown. Therefore, the spirit of the present disclosure is not limited by relative sizes or intervals shown in the accompanying drawings.

Hereinafter, the embodiments of the present disclosure are described in detail with reference to the accompanying drawings to enable those skilled in the art to which the present disclosure pertains to easily practice the present disclosure.

FIG. 1 is a diagram for describing operations of an electronic apparatus and a plurality of display devices according to one or more embodiments of the present disclosure.

Referring to FIG. 1, an electronic apparatus 100 may communicate with a display group 200 including a plurality of display devices 210-1 to 210-4. The electronic apparatus 100 may acquire arrangement information of the plurality of display devices 210-1 to 210-4 included in the display group 200, and provide an image signal or the arrangement information to each of the plurality of display devices 210-1 to 210-4 based on the arrangement information.

Here, the electronic apparatus 100 may be installed outside the display group 200 and communicate with the plurality of display devices 210-1 to 210-4.

The electronic apparatus 100 according to the one or more embodiments of the present disclosure may be implemented as a control box (e.g., S-Box or one-connect (OC) Box) that controls the display devices 210-1 to 210-4, or may be implemented as a set-top box that provides an image. However, the electronic apparatus 100 is not limited thereto, and may be implemented as at least one of a smartphone, a tablet personal computer (PC), a desktop PC, a laptop PC, a PC, a set-top box, an over-the-top media service (or OTT service) server, a console (or video game console), a Blu ray player, a digital versatile disc (DVD) player, a home automation control panel, a security control panel, a media box (e.g., Samsung HomeSync™, AppleTV™, or Google TV™), and a game console (e.g., Xbox™ or PlayStation™).

If the electronic apparatus 100 is implemented as the set-top box, the electronic apparatus 100 may provide the image signal based on the arrangement information acquired by the electronic apparatus 100 to each of the display devices 210-1 to 210-4. If the electronic apparatus 100 is implemented as the control box, the electronic apparatus 100 may provide the arrangement information to each of the display devices 210-1 to 210-4.

Meanwhile, each of the display devices 210-1 to 210-4 may output the image received from the electronic apparatus 100. In addition, the image provided from a separate content source or stored in each of the display devices 210-1 to 210-4 may be output based on the arrangement information. Here, the separate content source may be a apparatus that provides content to each of the display devices 210-1 to 210-4 and may be connected to each of the display devices 210-1 to 210-4 via an optical cable, a high-definition multimedia Interface (HDMI) cable, or the like. The content source may be implemented as the above-described set-top box, smartphone, television (TV), PC, media box or the like. However, the content source is not limited thereto.

Each of the display devices 210-1 to 210-4 may include a plurality of display modules, and each of the plurality of display modules may include a plurality of light-emitting diode (LED) elements. In detail, each of the display devices 210-1 to 210-4 may be implemented in any of various types of displays such as a liquid crystal display (LCD), an organic light-emitting diode (OLED), a liquid crystal on silicon (LCoS), a digital light processing (DLP), a quantum dot (QD) display panel, a quantum dot light-emitting diode (QLED) display, a micro light-emitting diode (LED), or a mini LED display.

Meanwhile, each of the display devices 210-1, 210-2, 210-3, and 210-4 may be referred to by various expressions representing the same or similar concepts. For example, the display device may be replaced with an expression "display cabinet." However, in the present disclosure, the term "display device" is collectively used as a general term.

Here, each of the display devices 210-1 to 210-4 may display the same content or different content depending on the image signal provided from the electronic apparatus 100 or the image signal provided from an external content source. However, each of the display devices 210-1 to 210-4 is not limited thereto, and may output each image portion of the same content to display one entire image.

Each of the display devices 210-1 to 210-4 may include at least one communication module capable of communicating with the electronic apparatus 100. For example, each of the display devices 210-1 to 210-4 may receive the image signal or the arrangement information from the communication module. As another example, the electronic apparatus 100 may identify the position of the communication module included in each of the display devices 210-1 to 210-4 as the position of each of the display devices 210-1 to 210-4. This configuration may be described in detail in the description provided below.

Meanwhile, each of the display devices 210-1 to 210-4 may form the display group 200.

Here, the display group 200 may be implemented as a television (TV), and is not limited thereto. The display group 200 may be applied to any device having a display function without limitation such as a video wall, a large format display (LFD), a digital signage, a digital information display (DID), or a projector display. Alternatively, the display device 210 may be implemented not only as any of the various independent devices described above but may also be implemented in the form of a display panel or module applicable to such a device.

Meanwhile, the display 210 may be implemented as a touchscreen combined with a touch sensor, a flexible display, a rollable display, a three-dimensional (3D) display, a display in which the plurality of display modules are physically connected to one another, or the like.

The display group 200 may be referred to by various expressions that represent the same/similar concepts. For example, the display group 200 may be replaced with any of various expressions such as "display system", "video wall", "digital signage device", "modular display device", "display device", "signage system", and "modular display system". However, in the present disclosure, the term "display group 200" is collectively used as a general term.

Meanwhile, each of the display devices 210-1 to 210-4 included in the display group 200 may be physically and electrically connected to one another. Here, each of the display devices 210-1 to 210-4 being physically and electrically connected to one another may indicate that these display devices may be connected to one another via an interface such as a docking terminal, an HDMI port, a DisplayPort (DP), a red green blue (RGB) interface, a digital visual interface (DVI), a universal serial bus (USB), or Thunderbolt, which is provided on each of the display devices 210-1 to 210-4.

FIG. 1 shows a case where two display devices 210-1 and 210-2 are arranged in two lines in a vertical direction, and implemented as a display group 200 having a total size of 2*2. However, the number, arrangement direction, arrangement position, shape, or the like of the display devices 210 may be variously modified depending on the purpose of use, location, or the like of the display group 200. Here, the plurality of display devices 210-1 to 210-4 may be physically connected and joined to one another by using the docking terminal or the like provided on each of the display devices 210-1 to 210-4.

Meanwhile, each of the display devices 210-1 to 210-4 may be connected in a wireless manner via a wireless communication module such as a wireless fidelity (Wi-Fi) or Bluetooth module, regardless of whether the devices are physically connected to one another.

Meanwhile, the electronic apparatus 100 and each of the display devices 210-1 to 210-4 may also be connected to one another in a wireless manner via the wireless communication module or may be connected to one another via a wired interface such as the above-described HDMI or DP.

Each of the display devices 210-1 to 210-4 and the electronic apparatus 100 may be connected to and communicate with one another in the wired or wireless manner as described above, and the electronic apparatus 100 may thus perform various operations such as acquiring the arrangement information of each of the display devices 210-1 to 210-4. Each of the display devices 210-1 to 210-4 and the electronic apparatus 100 may include a communication device to perform the above communication. This configuration is described in detail below with reference to FIG. 2.

The electronic apparatus 100 according to one or more embodiments may perform the communication with the plurality of display devices 210-1 to 210-4 belonging to the display group 200 to acquire the arrangement information of each of these devices. Here, the arrangement information may indicate information on relative positions of each of the plurality of display devices 210-1 to 210-4.

For example, as shown in FIG. 1, if the display group 200 includes the first display device 210-1, the second display device 210-2, the third display device 210-3, and the fourth display device 210-4, the arrangement information may include information indicating that the first display device 210-1 is positioned in an upper left region, the second display device 210-2 is positioned in an upper right region, the third display device 210-3 is positioned in a lower left region, and the fourth display device 210-4 is positioned in a lower right region.

FIG. 1 shows a case where each of the display devices 210-1 to 210-4 included in the display group 200 are connected to one another in a 2*2 configuration by using the docking terminals or the like separately provided on each of the display devices 210-1 to 210-4, thus forming a rectangular shape. However, each of the display devices 210-1 to 210-4 may be arranged to be spaced apart from each other. In this case as well, the arrangement information may include information indicating that the first display device 210-1 is positioned in the upper left region, the second display device 210-2 is positioned in the upper right region, the third display device 210-3 is positioned in the lower left region, and the fourth display device 210-4 is positioned in the lower right region.

The electronic apparatus 100 of the present disclosure may provide the image signal to each of the display devices 210-1 to 210-4 based on the arrangement information of the plurality of display devices 210-1 to 210-4. Each of the display devices 210-1 to 210-4 may output an image corresponding to the received image signal. As another example, the electronic apparatus 100 may provide only the acquired arrangement information to the plurality of display devices 210-1 to 210-4. In this case, the plurality of display devices 210-1 to 210-4 may receive the image signal from a separate content source device, and each of the display devices 210-1 to 210-4 may output the image based on the provided arrangement information.

Figure 2:
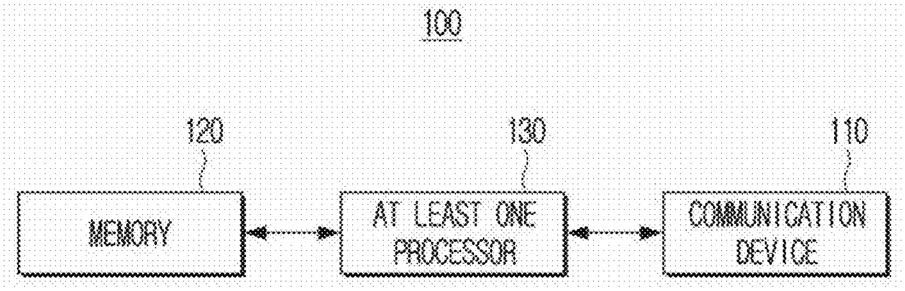
FIG. 2 is a block diagram for describing a configuration of the electronic apparatus according to one or more embodiments of the present disclosure.

FIG. 2 is a block diagram for describing a configuration of the electronic apparatus according to one or more embodiments of the present disclosure.

Referring to FIG. 2, the electronic apparatus 100 may include a communication device 110, a memory 120, and at least one processor 130. FIG. 2 shows that the electronic apparatus 100 includes only a basic configuration (that is, the communication device, the memory, and the processor). However, the electronic apparatus 100 may include various components in addition to the above-described components.

The communication device 110 is a component for performing the communication with various types of external devices by using various types of communication methods. The communication device 110 may include a Wi-Fi module, the Bluetooth module, an infrared communication module, the wireless communication module or the like.

The communication device 110 according to one or more embodiments may be disposed on the electronic apparatus 100 to acquire information on a distance between the plurality of display devices. Here, the distance information may include a distance value between one point of the communication device 110 and one point of each of the plurality of display devices.

The communication device 110 may include the plurality of communication modules implemented as a plurality of hardware chips, and each of the communication modules may acquire its distance from the display device. Here, an operation of each communication module is described in detail with reference to FIG. 4.

Meanwhile, the memory 120 may be electrically connected to at least one processor 130 and may store data required in the one or more embodiments of the present disclosure. For example, the memory 120 may be implemented as an internal memory included in the processor 130, such as a read-only memory (ROM, e.g., electrically erasable programmable read-only memory (EEPROM)) or a random access memory (RAM), or as a memory separate from at least one processor 130.

The memory 120 may be implemented in the form of a memory embedded in the electronic apparatus 100 or in the form of a memory detachable from the electronic apparatus 100, depending on a data storage purpose. For example, data for driving the electronic apparatus 100 may be stored in the memory embedded in the electronic apparatus 100, and data for an extension function of the electronic apparatus 100 may be stored in the memory detachable from the display device (electronic apparatus 100). If implemented as the memory embedded in the display device (electronic apparatus 100), the memory 120 may be at least one of a volatile memory (e.g., dynamic random access memory (DRAM), static RAM (SRAM), or synchronous dynamic RAM (SDRAM)), or a non-volatile memory (e.g., one time programmable read only memory (OTPROM), programmable ROM (PROM), erasable and programmable ROM (EPROM), electrically erasable and programmable ROM (EEPROM), mask ROM, flash ROM, flash memory (e.g., NAND flash, or NOR flash), hard drive, or solid state drive (SSD)).

Meanwhile, an example in the drawing shows that the electronic apparatus 100 includes one memory. However, in case of referring to the volatile memory and the non-volatile memory separately, the electronic apparatus 100 may be referred to as including the plurality of memories.

The memory 120 according to one or more embodiments may store at least one instruction. Here, at least one instruction may correspond to at least one instruction for the electronic apparatus 100 to acquire the arrangement information of the plurality of display devices within the display group. The memory 120 may also store information necessary for an operation of the electronic apparatus 100.

According to one or more embodiments, the memory 120 may store the arrangement information of the communication module included in each of the plurality of display devices or size information of each of the plurality of display devices. The electronic apparatus 100 may identify whether the respective display devices are adjacent to each other based on the arrangement information of the communication modules included in the display devices. Details thereof are described below with reference to FIG. 6A.

According to one or more embodiments, the memory 120 may store the content received from the external device or the acquired arrangement information. The electronic apparatus 100 may transmit partial images of a content image to each of the display devices based on the arrangement information. This configuration is described in detail below with reference to FIG. 8. However, the above-described examples are only illustrative, and the electronic apparatus 100 may acquire the arrangement information and store information other than information necessary to transmit the image to each of the display devices.

At least one processor 130 may perform overall control operations of the electronic apparatus 100. In detail, at least one processor 130 may perform a function for controlling overall operations of the electronic apparatus 100.

At least one processor 130 may be implemented as a digital signal processor (DSP), a microprocessor, or a time controller (TCON), which processes digital signals. However, the processor 130 is not limited thereto. The processor 130 may include one or more of a central processing unit (CPU), a micro controller unit (MCU), a micro processing unit (MPU), a controller, an application processor (AP), a graphics-processing unit (GPU), a communication processor (CP) or an advanced RISC machine (ARM) processor, or may be defined by these terms. In addition, at least one processor 130 may be implemented in a system-on-chip (SoC) or a large scale integration (LSI), in which a processing algorithm is embedded, or may be implemented in the form of a field programmable gate array (FPGA). In addition, at least one processor 130 may perform various functions by executing computer executable instructions stored in the memory. Meanwhile, FIG. 2 shows that the electronic apparatus 100 includes only one processor. However, in implementation, the electronic apparatus 100 may include a plurality of processors (for example, the CPU and the GPU or the CPU and the DSP).

According to one or more embodiments, at least one processor 130 may control the communication device 110 to acquire the distance information between the communication device 110 and the plurality of display devices. Here, at least one processor 130 may control the plurality of communication modules included in the communication device 110 and arranged in different positions to acquire the distance information.

Here, at least one processor 130 may control the plurality of communication modules to acquire the distance information between the plurality of communication modules and the communication module disposed in each display device.

At least one processor 130 may acquire the arrangement information of the plurality of display devices within the display group based on the distance information. Here, the arrangement information may include the position information of each display device. Here, the position information of each display device may be the position information of the communication module included in each display device. Here, the position information may include coordinate values of a plurality of components. This configuration is described in detail below with reference to FIGS. 5A and 5B.

At least one processor 130 may compare the coordinate values of the respective components and acquire a difference value for each component. Here, at least one processor 130 may acquire whether the display devices are adjacent to each other or spaced apart from each other based on the difference value for each component. In addition, at least one processor 130 may acquire whether the display devices are adjacent to each other or spaced apart from each other based on mount information and the difference value for each component. This configuration is described in detail below with reference to FIG. 6A and subsequent drawings.

According to one or more embodiments, at least one processor 130 may provide the acquired arrangement information and image to each of the display devices.

According to one or more embodiments, at least one processor 130 may identify each of the plurality of partial images corresponding to each of the plurality of display devices based on the arrangement information, and provide a signal corresponding to each partial image to each of the plurality of display devices.

Here, at least one processor 130 may identify a pixel pitch of each of the plurality of display devices based on the resolution information and size difference of each display device. At least one processor 130 may downsample the remaining partial images, except for the partial image corresponding to the display device having the maximum pixel pitch, based on a pixel pitch difference, and provide the downsample d partial image and remaining partial images to each of the display devices. This configuration is described in detail below with reference to FIG. 8 and subsequent drawings.

Hereinafter, the following description describes an operation in which at least one processor 130 acquires the distance between the plurality of display devices by using the plurality of communication modules (interfaces) included in the communication device.

Figure 3:
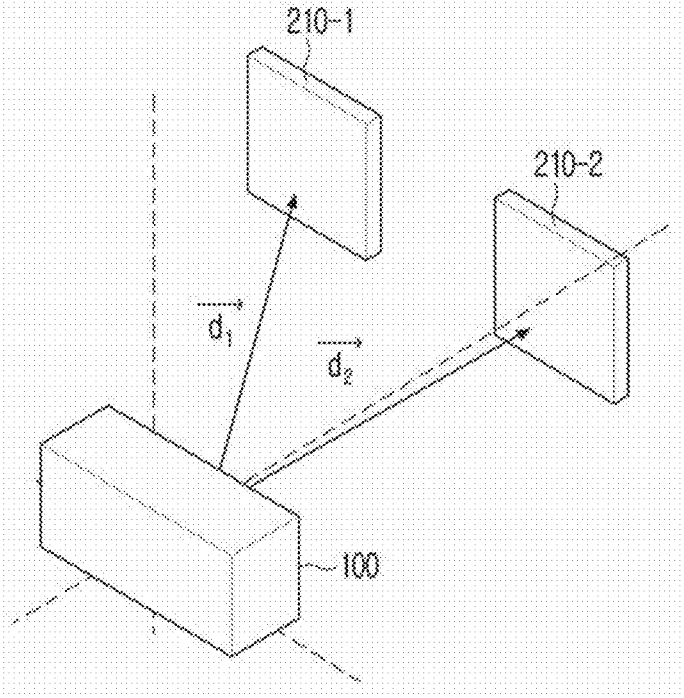
FIG. 3 is a diagram for describing the operations of the electronic apparatus according to one or more embodiments of the present disclosure.
Figure 4:
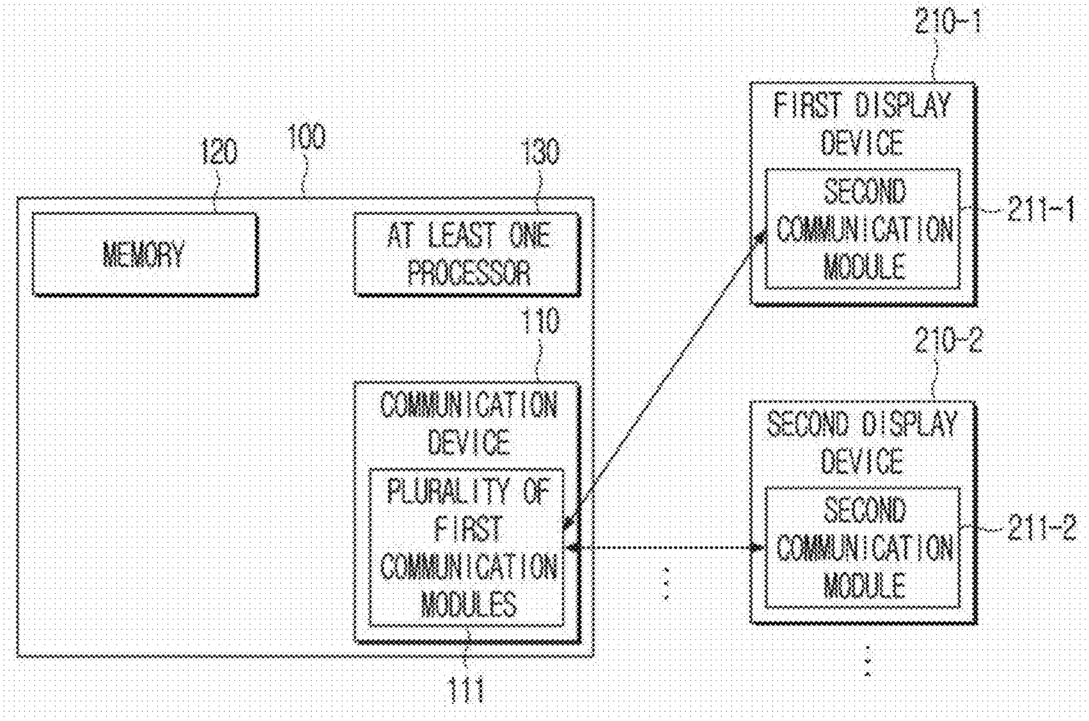
FIG. 4 is a diagram for describing the operations of the electronic apparatus according to one or more embodiments of the present disclosure.

FIGS. 3 and 4 are diagrams for describing the operations of the electronic apparatus according to one or more embodiments of the present disclosure.

Referring to FIG. 3, the electronic apparatus 100 may acquire the distance information between the plurality of display devices 210-1, 210-2, and others. The electronic apparatus 100 may acquire the arrangement information of the plurality of display devices 210-1, 210-2, and others based on the distance information. FIG. 3 and FIG. 4 provided below show a situation where the plurality of display devices 210-1, 210-2, and others are implemented as two display devices (i.e., first display device 210-1 and second display device 210-2), which is only an example, and may be implemented as three or more display devices 210-1, 210-2, and others. However, for convenience of description, the following description assumes a situation where the plurality of display devices 210-1, 210-2, and others are implemented as the first display device 210-1 and the second display device 210-2.

For example, as described above, the electronic apparatus 100 may calculate its distance value to each of the display devices 210-1 and 210-2 by measuring a time of flight (ToF). The electronic apparatus 100 is unable to identify the exact arrangement information of each of the display devices 210-1 and 210-2 based on only each distance value. That is, the electronic apparatus 100 is unable to identify a relative position of each of the display devices 210-1 and 210-2 by using only the distance values. Accordingly, the electronic apparatus 100 must acquire information including a direction (e.g., vector ($\vec{d1}$, $\vec{d2}$) to identify the relative position of each of the display devices 210-1 and 210-2.

The electronic apparatus 100 may use the plurality of communication modules to identify the relative position of each of the display devices 210-1 and 210-2 relative to the electronic apparatus 100. This configuration is described in detail below with reference to FIG. 4.

Referring to FIG. 4, the electronic apparatus 100 may acquire the distance information by using a plurality of first communication modules 111, second communication modules 211-1 and 211-2 respectively included in the first display device 210-1 and the second display device 210-2.

According to one or more embodiments, the communication device 110 may include the plurality of first communication modules 111 disposed at different positions on the electronic apparatus 100. The plurality of first communication modules 111 may communicate with the second communication modules 211-1 and 211-2 respectively included in the first display device 210-1 and the second display device 210-2. That is, the first communication module 111 may be a component that enables the electronic apparatus 100 to acquire the distance information or the like by performing the communication with the plurality of display devices 210, and the second communication modules 211-1 and 211-2 may be components that enables the plurality of display devices 210 to transmit information necessary for the distance information by performing the communication with the electronic apparatus 100 via the first communication module 111.

Here, the plurality of first and second communication modules 111 and 211 may each be implemented in the form of at least one hardware chip. In detail, each of the communication modules 111 and 211 may be implemented as the Wi-Fi module, the Bluetooth module, the infrared communication module, the wireless communication module or the like. For example, the Wi-Fi module and the Bluetooth module may perform the communication in a Wi-Fi mode and a Bluetooth mode, respectively. In case of using the Wi-Fi module or the Bluetooth module, the communication module may first transmit and receive various connection information such as a service set identifier (SSID) and a session key, connect the communication using this connection information, and then transmit and receive various information.

The infrared communication module may perform the communication based on infrared data association (IrDA) technology for transmitting data over a short distance by using an infrared ray between visible light and millimeter waves.

In addition to the above-described communication module, each of the communication modules 111 and 211 may be implemented as at least one communication chip performing the communication based on various wireless communication standards such as Zigbee, third generation (3G), 3rd generation partnership project (3GPP), long term evolution (LTE), LTE advanced (LTE-A), 4th generation (4G), and 5th generation (5G).

In addition, each of the communication modules 111 and 211 may include at least one of the wired communication modules performing the communication by using a local area network (LAN) module, an Ethernet module, a pair cable, a coaxial cable, an optical fiber cable, an ultra wide-band (UWB) module or the like. The communication device 110 may also be referred to as a transceiver.

For example, both the first communication module 111 and the second communication module 211 may be implemented using the UWB modules. The UWB module may correspond to a module for performing the communication according to a UWB communication standard. Here, UWB communication may be a wireless communication technology that uses an ultra-wideband frequency band (e.g., 3.1 GHz to 10.6 GHz) and has a bandwidth of 500 MHz or more. In detail, the UWB communication technology has a relatively wide bandwidth compared to other communication technologies such as LAN (e.g., 20 MHz to 160 MHz), 4G (e.g., 1.4 MHz to 20 MHz), and 5G (e.g., 100 MHz to 400 MHz), and has a relatively short transmission distance (e.g., 200 m or less). Due to these characteristics/features, the UWB communication technology is advantageous for relatively short-distance communication or precise position measurement.

According to one or more embodiments, the electronic apparatus 100 may acquire a distance between the two communication modules by using the first communication module 111 and the second communication module 211.

In detail, at least one processor 130 may control the first communication module 111 to acquire the distance information between the plurality of first communication modules 111 and the plurality of second communication modules 211-1 and 211-2 respectively included in the plurality of display devices 210-1 and 210-2. Here, the distance information may include at least one of the time of flight (ToF) or the distance value.

In detail, the first communication module 111 may acquire the ToF. Here, ToF may indicate a signal travel time between the communication device 110 and the display device. That is, the ToF may be a value acquired by subtracting a difference between a time at which the second communication module 211 receives a signal output by the first communication module 111 and a time at which the second communication module 211 outputs a corresponding signal from a difference between a time at which the first communication module 111 outputs the signal and a time at which the first communication module 111 receives the corresponding signal.

Accordingly, the first communication module 111 may acquire a ToF value based on the difference between the time at which the first communication module 111 outputs the signal and the time at which the first communication module 111 receives the corresponding signal. Here, the first communication module 111 may acquire a distance between the first communication module 111 and the second communication module 211-1 or 211-2 based on the acquired ToF value. That is, if a speed of light is c, a distance value d may be calculated by $d=(ToF \times c)/2$. Here, the distance value may be expressed in any of various units (e.g., meter, inch, or feet) and may be referred to as the distance, a straight-line distance, or the like. However, in the present disclosure, for convenience of description, the term "distance value" is collectively used as a general term.

According to one or more embodiments, at least one processor 130 may acquire the arrangement information of the first display device 210-1 and the second display device 210-2 based on the acquired distance information.

For example, if the plurality of first communication modules 111 are implemented as three communication modules, each of the plurality of first communication modules 111 may acquire three distances for the display devices 210. At least one processor 130 may identify the relative positions of the first display device 210-1 and the second display device 210-2 based on three distance values by using a triangulation method.

Here, the triangulation method may correspond to a technique for measuring a position of an object by using a calculated distance from three or more communication modules (e.g., transmitters (anchors)) to the object (e.g., receiver (tag)). In detail, the position of the object may be measured as a point where three virtual spheres intersect. Here, each sphere may correspond to a sphere centered on the position of each communication module and having a radius of the calculated distance from each communication module to the object.

Here, three or more transmitters may be required to measure the position of the object by using the triangulation method, and information on the positions of three or more transmitters need to be acquired in advance. Here, the position of each transmitter may be a reference point for identifying the position of the object. For example, if the communication device includes three first communication modules 111, each first communication module 111 may measure the positions of the plurality of display devices 210-1 and 210-2 by using the triangulation method based on the acquired distance information. However, even if the electronic apparatus 100 has less than three first communication modules 111 (e.g., two first communication modules 111), at least one processor 130 may acquire the arrangement information of the plurality of display devices 210-1, 210-2, and others by using the above-described triangulation method. This configuration is described in detail below with reference to FIGS. 5A and 5B.

The above-described triangulation method may also be referred to as two way ranging (TWR). However, in the present disclosure, for convenience of description, the term "triangulation method" is collectively used as a general term.

For example, at least one processor 130 may form three virtual spheres based on three distance values acquired for the first display device 210-1, and identify a point where the three spheres intersect as the position of the second communication module 211-1 of the first display device 210-1. At least one processor 130 may identify the position of the second communication module 211-1 as the position of the first display device 210-1. At least one processor may repeat this process based on three distance values acquired for the second display device 210-2. Here, as shown in FIG. 3, at least one processor 130 may acquire the arrangement information indicating that the first display device 210-1 is disposed to the left of the second display device 210-2, and the second display device 210-2 is disposed to the right of the first display device 210-1.

At least one processor 130 may acquire the arrangement information by using the positions of the plurality of first communication modules 111 as a reference point. Here, each position of the first communication modules 111 may be stored in the memory 120. Here, each position may include information on the position at which each of the first communication modules 111 is disposed within the electronic apparatus 100 and a distance between the plurality of first communication modules 111. For example, each position of the first communication modules 111 may include horizontal position, vertical position, and depth values based on a front surface of the electronic apparatus 100. At least one processor 130 may set a virtual origin and reference coordinates based on the positions of the plurality of first communication modules 111 and acquire the coordinates of each of the second communication modules 211-1 and 211-2. This configuration is described with reference to FIG. 6A.

At least one processor 130 may acquire the arrangement information of each of the display devices 210-1 and 210-2 by using the triangulation method as in the example described above, which may be only an example. At least one processor 130 may use a time difference of arrival (TDoA) method that uses a time difference between the signals output by the second communication modules 211-1 and 211-2 reaching each of the first communication modules 111, and acquire the arrangement information by using various methods such as an angle of arrival (AoA) method that identifies the position of the second communication module by using the angle at which the signals output by the second communication modules 211-1 and 211-2 reach the first communication modules 111.

Accordingly, even if the electronic apparatus 100 is directly physically connected to one of the plurality of display devices 210, or each of the plurality of display devices 210-1 and 210-2 are not physically connected to each other, the electronic apparatus 100 may identify the arrangement of the plurality of display devices 210 included in the display group by using a wireless positioning method (or position determination technology (PDT)).

Meanwhile, at least one processor 130 may acquire the position information including more specific information than the arrangement information based on the distance information of each of the display devices 210-1 and 210-2.

Figure 5A:
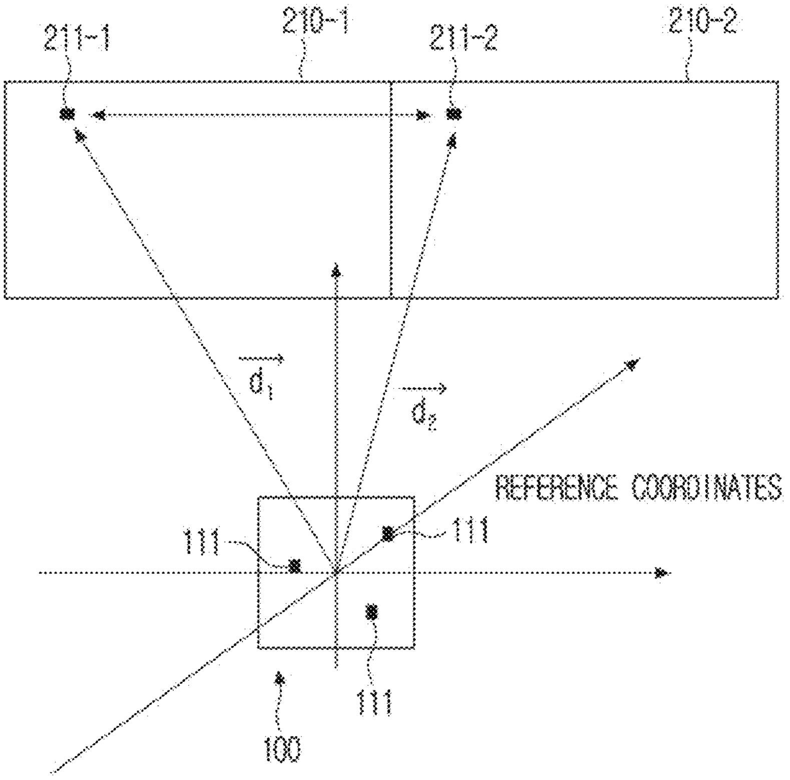
FIG. 5A is a diagram for describing position information of the display device according to one or more embodiments of the present disclosure.
Figure 5B:
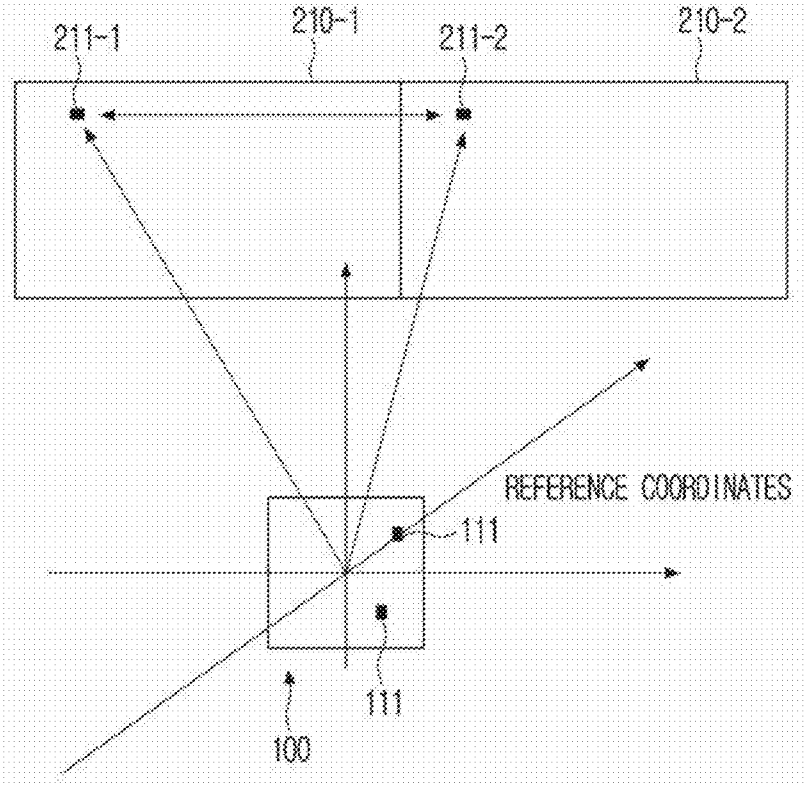
FIG. 5B is a diagram for describing position information of the display device according to one or more embodiments of the present disclosure.

FIGS. 5A and 5B are diagrams for describing the position information of the display device according to one or more embodiments of the present disclosure.

FIG. 5A shows the electronic apparatus 100 and the plurality of first communication modules 111 included therein, the first display device 210-1 and the second display device 210-2, and the plurality of second communication modules 211-1 and 211-2 respectively included in the display devices 210-1 and 210-2.

According to one or more embodiments, the electronic apparatus 100 may acquire the position information of each of the plurality of display devices 210-1 and 210-2. Here, the position information may correspond to the position information of each of the second communication modules 211-1 and 211-2 respectively included in the first display device 210-1 and the second display device 210-2. The position information of each of the second communication modules 211-1 and 211-2 may be represented in the form of a vector ($\vec{d1}$, $\vec{d2}$) including distance values d1 and d2. That is, the position information of each of the display devices 210-1 and 210-2 may have a narrower meaning than the arrangement information which includes only a relative position relationship between the display devices 210-1 and 210-2.

Here, the position information may each include the relative position based on a fixed reference point. Here, the fixed reference point may be implemented as the reference coordinates. Here, the reference coordinates may be acquired by the plurality of first communication modules 111. The reference coordinates may be information necessary to acquire the coordinates of the plurality of components of each of the second communication module 211 described below. The electronic apparatus 100 may acquire the coordinates of the second communication module 211 based on the reference coordinates. This configuration is described below with reference to FIG. 6A and subsequent drawings.

Meanwhile, the position information may include the direction and distance information of the position of each of the display devices 210 relative to the electronic apparatus 100. Here, the direction and distance may be measured based on various points on each of the display devices 210. For example, the electronic apparatus 100 may measure the direction and distance based on a left edge of the display device 210, or the electronic apparatus 100 may measure the direction and distance based on the center point of the display device 210.

According to one or more embodiments, the electronic apparatus 100 may identify the position information of each of the second communication modules 211-1 and 211-2. That is, the electronic apparatus 100 may acquire the position information of each of the second communication modules 211-1 and 211-2 as the position information of each of the first display device 210-1 and the second display device 210-2.

Accordingly, the electronic apparatus 100 may identify the position information of the plurality of display devices 210 based on a predetermined point (e.g., position of the second communication module), thereby increasing the consistency and accuracy of the position information of each of the plurality of display devices 210.

Meanwhile, the electronic apparatus 100 may form the reference coordinates even if the electronic apparatus 100 includes two first communication modules 111, in addition to the case where the electronic apparatus 100 includes three or more first communication modules 111, and may identify the position of each of the plurality of display devices 210 by using the triangulation method.

As described above, in general, if only two transmitters (anchors) exist in the triangulation method, the electronic apparatus 100 is unable to measure the position of the object (tag). For example, if the electronic apparatus 100 includes two first communication modules 111, the electronic apparatus 100 may be unable to measure the exact position of the second communication module 211 independently of a distance between the second communication module 211 and the first communication module 111.

In this case, the electronic apparatus 100 may use the second communication module 211 included in the display device 210 together. That is, the electronic apparatus 100 may form a reference point for triangulation using two first communication modules 111 and one or more second communication modules 211.

Meanwhile, if position (coordinate) perception of some screen modules in the electronic apparatus 100 is inaccurate, the positions calculated as the relative positions may be transmitted to the electronic apparatus 100 by the nearby display devices performing the communication therebetween. For example, if the second display device 210-2 is out of a communication range of the electronic apparatus 100 or is unable to identify its distance from the plurality of first communication modules 111 due to an obstacle or the like, the second communication module 211-1 of the first display device 210-1 may acquire the distance information by communicating with the second communication module 211-2 of the second display device 210-1. The first display device 210-1 may transmit the acquired distance information to the electronic apparatus 100, and the electronic apparatus 100 may thus identify the position of the second display device 210-2 (or the position of the second communication module 211-2 of the second display device 210-2) based on the received distance information.

Referring to FIG. 5B, the electronic apparatus 100 may include two first communication modules 111. This configuration may be distinguished from the electronic apparatus 100 including three first communication modules 111 as shown in FIG. 5A. The electronic apparatus 100 may identify the position of the remaining display devices included in the corresponding display group by using the information acquired by the second communication module 211 of one of the plurality of display devices 210 belonging to the display group.

For example, the first display device 210-1 among the plurality of display devices 210-1 and 210-2 included in the display group may transmit the distance information from its adjacent display device 210-2 to the electronic apparatus 100 via the second communication module 211-1.

Here, the first display device 210-1 among the plurality of display devices 210-1 and 210-2 may be determined by various criteria. For example, the electronic apparatus 100 may determine, as the first display device, the display device that is first turned on if all of the plurality of display devices 210-1 and 210-2 included in the display group are turned off. Alternatively, the electronic apparatus 100 may determine, as the first display device, the display device from which the electronic apparatus 100 first acquires the distance information among the plurality of display devices 210-1 and 210-2. However, the present disclosure is not limited thereto.

Here, the electronic apparatus 100 may transmit the distance information to its adjacent display device 210-2. The distance information may be distance information between the second communication module 211-1 of the first display device 210-1 and the second communication module 211-2 of the adjacent second display device 210-1. The distance included in the distance information may be calculated using the ToF in the same way as the distance between the first communication module 111 and the second communication module 211-1 is measured.

One of two first communication modules 111 included in the electronic apparatus 100 may receive the distance information transmitted by the first display device 210-1. The electronic apparatus 100 may separately acquire the distance information from each of two first communication modules 111 to the second communication module of the second display device 210-2.

The electronic apparatus 100 may acquire the position information of the second communication module 211-2 of the second display device 210-2 based on the distance information from the second communication module 211-1 of the first display device 210-1 to the second communication module 211-2 of the second display device 210-2, and the distance information from each of two first communication modules 111 to the second communication module 211-2 of the second display device 210-2.

That is, even if the electronic apparatus 100 includes only two first communication modules 111, unlike the case where the electronic apparatus 100 includes three first communication modules 111, the first communication modules 111 may form three reference points along with the second communication module 211-1 of the first display device 210-1. The electronic apparatus 100 may acquire the position information of the remaining second display device 210-2 by using three reference points based on the triangulation method described above.

Accordingly, if the electronic apparatus 100 includes two first communication modules 111, the second communication module of the first display device 210-1 may replace a function of the existing first communication module 111.

Meanwhile, even if the electronic apparatus 100 includes three or more first communication modules 111, the electronic apparatus 100 may acquire the position information of the remaining second display device 210-2 by using the second communication module 211 of the first display device 210-1. That is, the electronic apparatus 100 may acquire the position information of the second display device 210-2 based on a total of four reference points including three first communication modules 111 and one second communication module 211. However, this configuration may be only an example, and the electronic apparatus 100 may acquire the position information of the remaining second display device 210-2 by using the second communication modules 211-1 of the plurality of first display devices 210-1 or the plurality of second communication modules 211-1 included in one first display device 210-1.

Accordingly, the electronic apparatus 100 may perform more precise and effective position measurement by using the triangulation method based on four or more reference points, compared to acquiring the position information of each of the display devices by using three reference points.

Meanwhile, the electronic apparatus 100 may also acquire the position information including the coordinates indicating the exact position of the second communication module 211, a difference between the coordinates of the second communication modules 211, or whether the plurality of display devices 210-1 and 210-2 are adjacent to each other.

FIGS. 6A to 6D are diagrams for describing an operation for identifying whether the display devices are adjacent to each other according to one or more embodiments of the present disclosure.

Figure 6A:
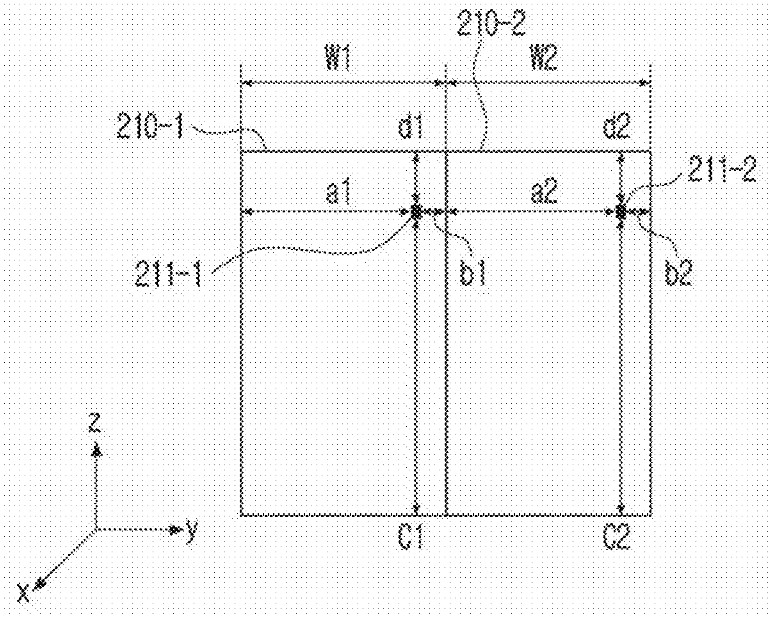
FIG. 6A is a diagram for describing an operation for identifying whether the display devices are adjacent to each other according to one or more embodiments of the present disclosure.

FIG. 6A shows the first display device 210-1 and the second display device 210-2 adjacent thereto. The display devices 210-1 and 210-2 may respectively include one second communication module 211-1 and one second communication module 211-2.

According to one or more embodiments, the electronic apparatus 100 may acquire information on whether the first display device 210-1 and the second display device 210-2 are adjacent to or spaced apart from each other. To this end, the electronic apparatus 100 may acquire the position information of the second communication modules 211-1 and 211-2, and compare the acquired position information of each of the second communication modules 211-1 and 211-2.

Here, the position information may include the position information of each of the second communication modules 211-1 and 211-2, and the position information of each of the second communication modules 211-1 and 211-2 may include the coordinates. Here, the coordinates may include the coordinate values of the plurality of components. For example, in case of coordinates based on an orthogonal coordinate system, the coordinates may be expressed as (A, B, C). In this case, the coordinate value of an x-component may correspond to A, the coordinate value of a y-component may correspond to B, and the coordinate value of a z-component may correspond to C.

According to one or more embodiments, each coordinate value of each component may be a calculated value based on the acquired distance information. Here, the electronic apparatus 100 may acquire the reference coordinates (or origin) by using the plurality of first communication modules 111, and each of the first communication modules 111 may acquire the coordinate value of each component of the second communication modules 211-1 and 211-2 by using the acquired distance information. Hereinafter, this configuration may be described in detail.

First, if the electronic apparatus 100 includes three first communication modules 111 arranged horizontally with the ground, the electronic apparatus 100 may acquire the origin and the reference coordinates based on the arrangement positions of the pre-stored plurality of first communication modules 111. In detail, the electronic apparatus 100 may arbitrarily set one of the plurality of first communication modules 111 as origin (0, 0, 0).

The electronic apparatus 100 may then set the second coordinates based on the actual arrangement position of another first communication module. For example, if the first communication module set as the origin and the first communication module set as the second coordinate are actually spaced apart from each other by a horizontal distance d1, the electronic apparatus 100 may set second coordinates to (d1, 0, 0).

Next, if information is stored indicating that the remaining one first communication module is actually spaced apart from the first communication module set as the origin by a horizontal distance d2, the electronic apparatus 100 may set third coordinates to (0, d2, 0).

Here, the electronic apparatus 100 may form a virtual first coordinate axis (e.g., x-axis) passing through the origin and the second coordinates, a virtual second coordinate axis (e.g., y-axis) passing through the origin and the third coordinates, and a virtual third coordinate axis (e.g., z-axis) orthogonal to a plane formed by the two coordinate axes (e.g., xy-plane) and passing through the origin. In this case, the x-axis and the y-axis may correspond to the horizontal direction relative to the ground, and the z-axis may correspond to the vertical direction relative to the ground.

Next, the electronic apparatus 100 may use the triangulation method to acquire the coordinate value of each component of the second communication module 211-1 or 211-2. That is, the electronic apparatus 100 may acquire equations of three spheres. Here, the equation of the sphere may correspond to the equation of the sphere having each of the three coordinates of the first communication modules 111 as the center and the distance values to the second communication modules 211-1 and 211-2 as the respective radii. The electronic apparatus 100 may acquire coordinate values (x, y, z) of each component of each of the second communication modules 211-1 and 211-2 from three equations. Here, each x, y, z value may correspond to a real solution of the three equations.

Hereinabove, the description describes that the electronic apparatus 100 uses a method in which one of the plurality of first communication modules 111 is arbitrarily set as the origin to acquire the coordinate values of each of the second communication modules 211-1 and 211-2, which is only an example, and the electronic apparatus 100 may set the origin or the reference coordinates in various ways, such as acquiring the reference coordinates by setting, as the origin, the center of a virtual triangle formed by the plurality of communication modules 111.

Meanwhile, according to one or more embodiments, the electronic apparatus 100 may acquire the difference value for each component by comparing the coordinates of each of the plurality of second communication modules 211-1 and 211-2 for each component. For example, if the coordinates of the second communication module 211-1 of the first display device 210-1 are acquired as (x1, y1, z1) and the coordinates of the second communication module 211-2 of the second display device 210-2 are acquired as (x2, y2, z2), the electronic apparatus 100 may acquire difference values for x-, y-, and z-components as $|x1-x2|$, $|y1-y2|$, and $|z1-z2|$, respectively.

Meanwhile, according to one or more embodiments, the electronic apparatus 100 may acquire whether the plurality of display devices 210-1 and 210-2 are adjacent to or spaced apart from the neighboring display devices 210-1 and 210-2, respectively, based on the difference value for each component.

Here, the adjacent display devices may indicate the plurality of display devices capable of being identified as one screen. The adjacent display devices may also be referred to as a joined display device. The plurality of adjacent display devices may be identified as a merged screen by the electronic apparatus 100, and may output an image having a sense of unity overall. The electronic apparatus 100 may control the plurality of display devices to display the image based on the acquired arrangement information.

On the other hand, the spaced-apart display devices may indicate the plurality of display devices, each of which may be perceived as an individual screen. The spaced-apart display devices may also be referred to as electronically separated displays. The spaced-apart display devices may be identified as the individual screens by the electronic apparatus 100, and each display device may independently output each partial image.

For example, the electronic apparatus 100 may store the mounting (or installation) information indicating a position where the second communication module 211-1 or 211-2 is disposed on each of the display devices 210-1 and 210-2, and acquire whether these display devices are adjacent to each other based on this information.

For example, in case of the first display device 210-1, the mount information may include information indicating that the second communication module 211-1 is spaced apart from a left edge by a1, from a right edge by b1, from a lower edge by c1, and from an upper edge by d1. The same applies to the second display device 210-2.

For example, the electronic apparatus 100 may store size information of each of the plurality of display devices 210-1 and 210-2, and acquire whether these devices are adjacent to each other based on this information.

For example, in case of the first display device 210-1, the size information may include a left-right width value W1 and a height value H1. The same applies to the second display device 210-2.

The electronic apparatus 100 may receive the above-described mount information or size information from each of the display devices 210-1 and 210-2, or from the external device.

According to one or more embodiments, the electronic apparatus 100 may acquire whether the plurality of display devices 210-1 and 210-2 are adjacent to each other based on the above-described mount information and the difference value for each component. In addition, the electronic apparatus 100 may additionally acquire whether the plurality of display devices 210-1 and 210-2 are adjacent to each other also based on the size information.

For example, as shown in FIG. 6A, x-, y-, and z-coordinate axis directions may respectively correspond to directions perpendicular to the front surfaces of the display devices 210-1 and 210-2, a direction (left-right direction) or in which the plurality of display devices 210-1 and 210-2 are disposed, and an up-down direction. The electronic apparatus 100 may identify the display devices 210-1 and 210-2 as being adjacent to each other if each of the difference value $|x1-x2|$ for the x-component, the difference value $|y1-y2|$ for the y-component, and the difference value $|z1-z2|$ for the z-component corresponds to its corresponding threshold range, and may identify the display devices 210-1 and 210-2 as being spaced apart from each other if the difference value for each component exceeds its threshold range.

In detail, the threshold range corresponding to each component may be a range from a reference value to a threshold value. Here, the reference value and the threshold value may correspond to each component. For example, a reference value of the y-component may correspond to (a1+b2) or (W1+W2)−(a1+b2), and a reference value of the x-component and a reference value of the z-component may correspond to zero.

If the first display device 210-1 and the second display device 210-2 are the same product and the size information and mount information of the devices are the same as each other, the reference value corresponding to the y-component may be W1 or W2.

Meanwhile, a threshold value of the y-component may be set to a value corresponding to a predetermined percentage of the reference value. A threshold value of each of the x-component and the z-component may be set to an arbitrary value.

For example, depending on a distance from which the user views the plurality of display devices 210-1 and 210-2, the electronic apparatus 100 may set the threshold value based on the minimum distance at which the plurality of display devices 210-1 and 210-2 may be perceived as being spaced apart from each other. The electronic apparatus 100 may set the threshold value to 5 cm if a viewer at a distance of 5 m may generally perceive the plurality of display devices 210-1 and 210-2 as being adjacent to each other in case that these devices are spaced apart from each other by a distance of less than 5 cm.

In other words, the electronic apparatus 100 may identify the plurality of display devices 210-1 and 210-2 as being adjacent to each other if a value $y2-y1|$ is within the threshold value from the reference value (W1+W2)−(a1+b2) or (a1+b2), and the values $|x1-x2|$ and $|z1-z2|$ are within the threshold value from zero.

FIG. 6A shows a situation where the electronic apparatus 100 may identify the plurality of display devices 210-1 and 210-2 as being adjacent to each other.

Figure 6B:
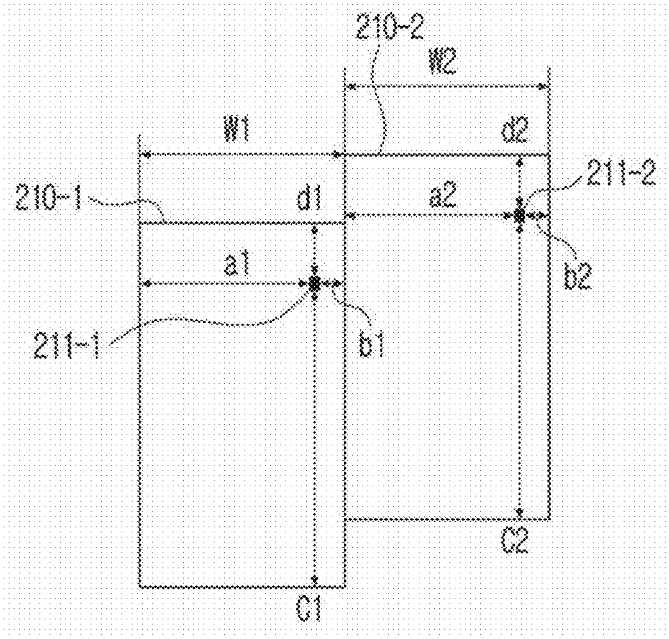
FIG. 6B is a diagram for describing an operation for identifying whether the display devices are adjacent to each other according to one or more embodiments of the present disclosure.

In contrast, FIG. 6B shows a situation where the difference value for the x-component and the difference value for the y-component are within the threshold range, while the difference value for the z-component exceeds the threshold range, and the electronic apparatus 100 may thus identify the plurality of display devices 210-1 and 210-2 as being spaced apart from each other.

Figure 6C:
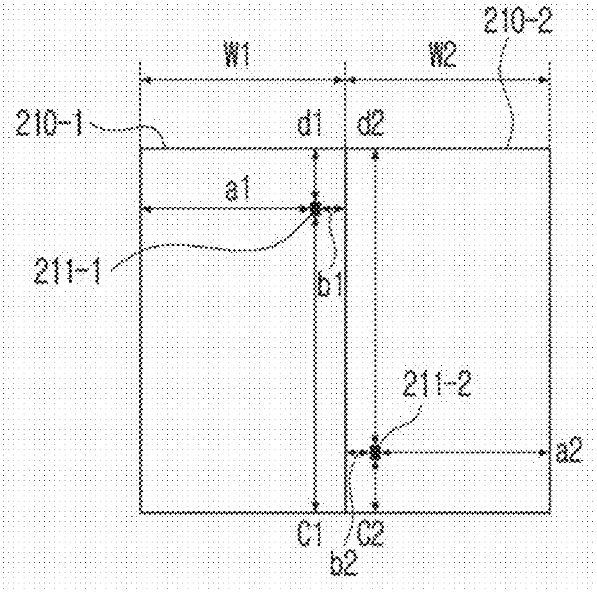
FIG. 6C is a diagram for describing an operation for identifying whether the display devices are adjacent to each other according to one or more embodiments of the present disclosure.

However, as shown in FIG. 6B, FIG. 6C shows a situation where the electronic apparatus 100 may identify the plurality of display devices 210-1 and 210-2 as being adjacent to each other even though the difference value for the z-component exceeds the threshold range.

In this case, the electronic apparatus 100 may identify whether the display devices are adjacent to each other by resetting the reference value based on the mount information and size information of each of the display devices 210-1 and 210-2. That is, the electronic apparatus 100 may perceive a rotation of the second display device 210-2 by using a separate sensor (e.g., gyro sensor) and reset the reference value if the plurality of display devices 210-1 and 210-2 are not disposed in such a way that the second communication modules 211-1 and 211-2 are respectively disposed at the same position (e.g., due to the rotation of some of the display devices).

For example, the electronic apparatus 100 may reset the reference value of the y-component to (W1+W2)−(a1+a2) or (b1+b2), and may reset the reference value of the z-component to (c1−c2) or (d2−d1). The electronic apparatus 100 may identify the plurality of display devices 210-1 and 210-2 as being adjacent to each other if the difference value for each component is within the threshold range based on the reset reference value.

Here, the electronic apparatus 100 may separately store the position information of the rotated second display device 210-2, and if the second display device 210-2 is used after being rotated by 180 degrees in this manner, the electronic apparatus 100 identify the second display device 210-2 as being adjacent to the first display device 210-1 based on the stored position information without an additional calculation process.

Figure 6D:
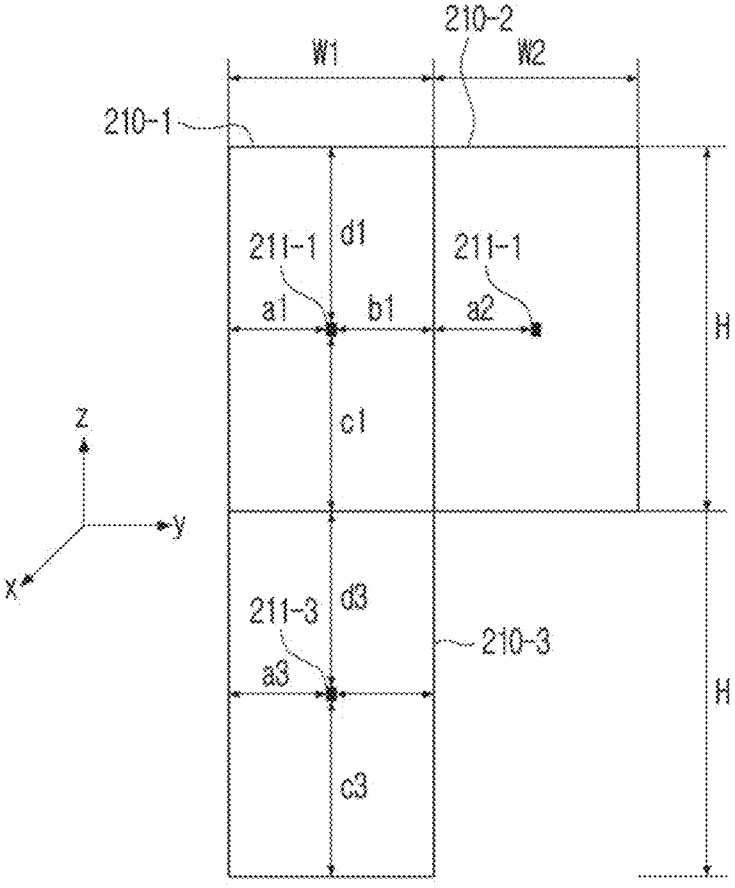
FIG. 6D is a diagram for describing an operation for identifying whether the display devices are adjacent to each other according to one or more embodiments of the present disclosure.

Meanwhile, as shown in FIG. 6D, the second communication module 211-1, 211-2, or 211-3 may be disposed at the center of each of the plurality of display devices 210-1, 210-2, and 210-3. As in the case where the second communication module is not disposed at the center of each of the plurality of display devices 210-1, 210-2, and 210-3, the electronic apparatus 100 may identify the reference value based on the mount information and size information of each display device.

For example, the reference value of the y-component may be set to (W1+W2)−(a1+a2), (a2+b1), (a2+b3), (W1+W2)/2, or the like. The reference value of the z-component may be set to 2H−(d1+c3), or (c2+d3), H, or the like. The reference value of the x-component may be set to zero, as in the examples shown in FIGS. 6A to 6C.

Meanwhile, at least one of the threshold range, the reference value, or the threshold value described above may be modified to a different value by a user setting or a manufacturer. The minimum distance at which the screens may be perceived as being spaced apart from each other is different depending on the individual user or the purpose of the plurality of display devices 210-1 and 210-2, and the electronic apparatus 100 may thus set different criteria for identifying whether the plurality of display devices 210-1 and 210-2 are adjacent to each other.

Meanwhile, the electronic apparatus 100 may calculate or update the above-described threshold range based on a predetermined event. For example, if its communication connection is established with one of the plurality of display devices 210-1 and 210-2 for the first time, the electronic apparatus 100 may calculate the threshold range based on an identification (ID) of the first display device 210-1 initially connected thereto. Alternatively, the electronic apparatus 100 may identify and update the threshold range at a predetermined time interval (or a regular cycle). Alternatively, the electronic apparatus 100 may calculate and update the threshold range if at least one of the plurality of display devices 210-1 and 210-2 is moved or has other state changes. However, the present disclosure is not limited thereto.

The electronic apparatus 100 may acquire whether the plurality of display devices 210-1, 210-2, and 210-3 are adjacent to or spaced apart from one another, and identify the adjacent plurality of display devices 210-1, 210-2, and 210-3 as a screen capable of outputting one image.

Figure 7A:
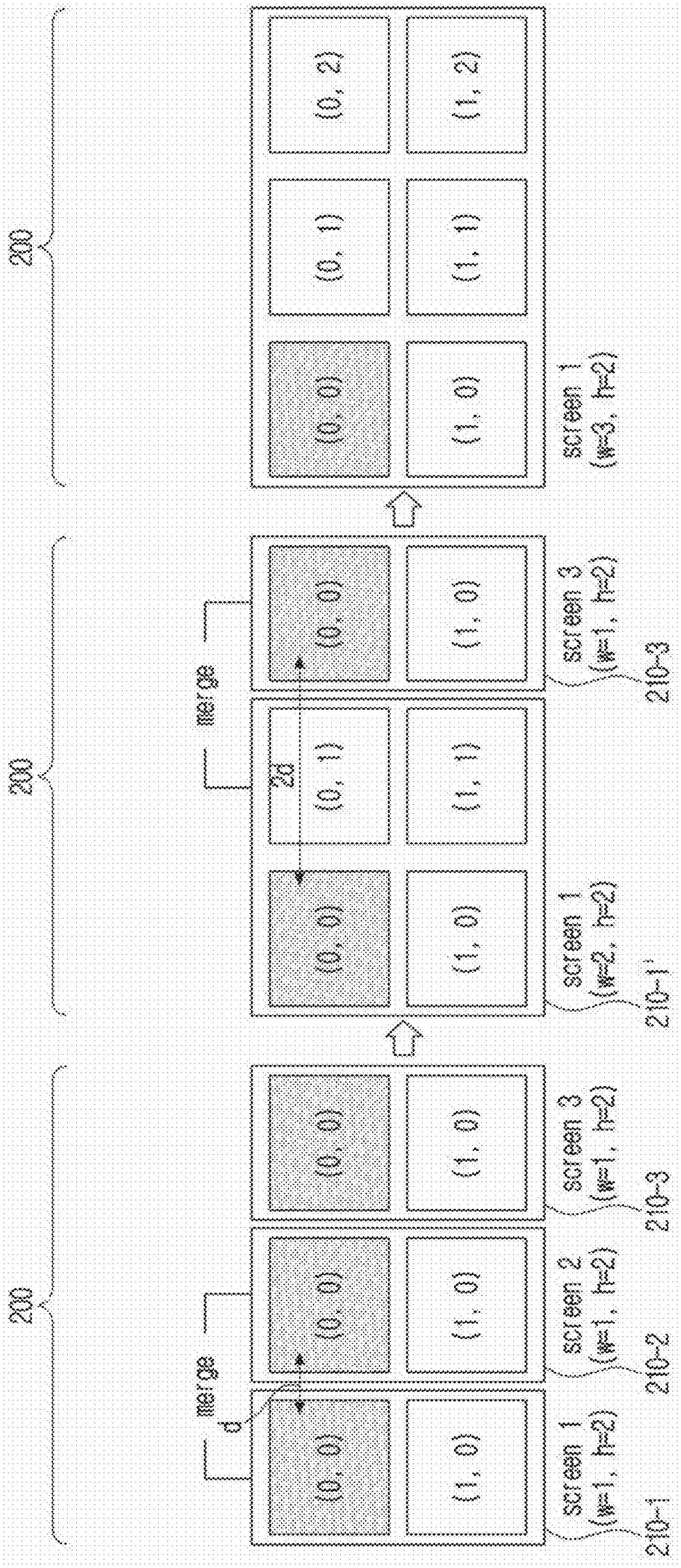
FIG. 7A is a diagram for describing adjacent display devices and spaced-apart display devices according to one or more embodiments of the present disclosure.
Figure 7B:
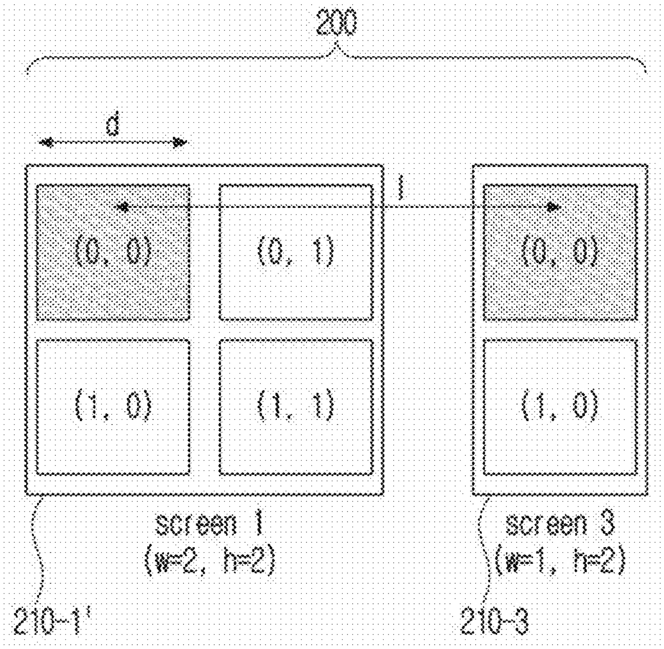
FIG. 7B is a diagram for describing adjacent display devices and spaced-apart display devices according to one or more embodiments of the present disclosure.
Figure 7C:
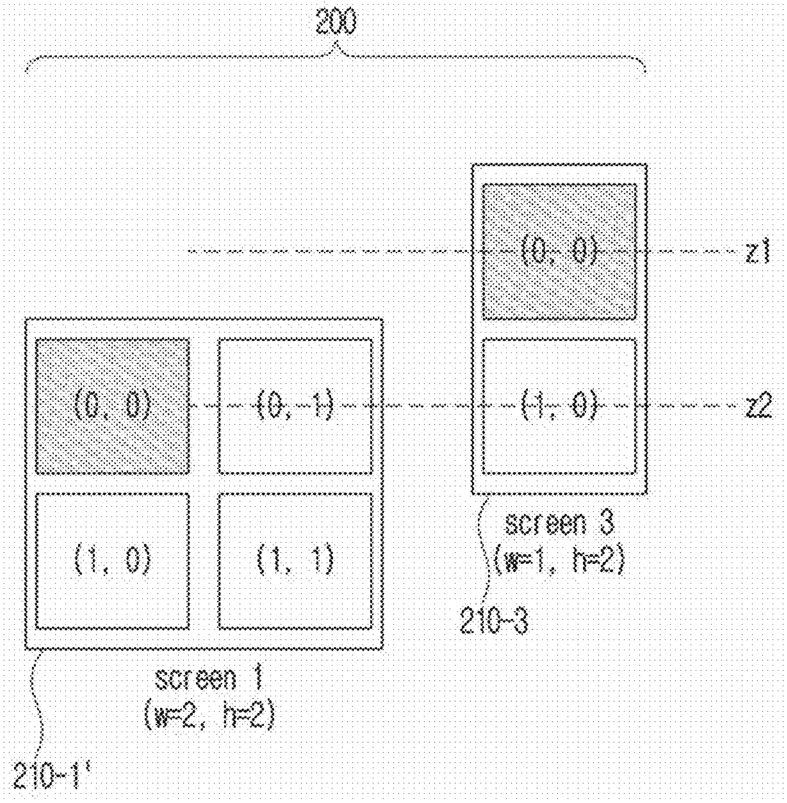
FIG. 7C is a diagram for describing adjacent display devices and spaced-apart display devices according to one or more embodiments of the present disclosure.

FIGS. 7A to 7C are diagrams for describing the adjacent display devices and the spaced-apart display devices according to one or more embodiments of the present disclosure.

Referring to FIG. 7A, the electronic apparatus 100 may identify the plurality of display devices 210-1, 210-2, and 210-3 as being all merged if the plurality of display devices 210-1, 210-2, and 210-3 included in the display group 200 are identified as being adjacent to one another. The electronic apparatus 100 may transmit the partial images corresponding to the merged plurality of display devices 210-1, 210-2, and 210-3, or transmit the acquired arrangement information. Details thereof are described with reference to FIG. 8.

Each of the display devices 210-1, 210-2, and 210-3 may correspond to a device having a size of 1×2, that is, a width unit w of 1 and a height unit h of 2. Each of the display devices 210-1, 210-2, and 210-3 may correspond to a device in which the display modules each having a size of 1×1 are merged. Here, the display module may correspond to the display device, the display cabinet, or an LED module having the size of 1×1. (0,0), (1,0), (1,1) or the like indicated on each of the display devices 210-1, 210-2, and 210-3 represents a position of the display module in each of the display devices 210-1, 210-2, and 210-3.

Although FIG. 7A shows arrows, which only shows that the display devices 210-1, 210-2, and 210-3, each of which has the basic size of 1×2, are merged into a display device having a size of 3×2, and does not necessarily show that the electronic apparatus 100 sequentially identifies whether the display devices 210-1, 210-2, and 210-3 are adjacent to one another based on their arrangement order.

For example, the electronic apparatus 100 may not necessarily identify whether the first display device 210-1, which is disposed on the left, is adjacent to the second display device 210-2 and then to the third display device 210-3, which is disposed on the right, in sequence. Instead, the electronic apparatus 100 may identify whether the second display device 210-2 is adjacent to the first display device 210-1 and then to the third display device 210-3, based on the second display device 210-2. Here, an operation of the electronic apparatus 100 acquiring the distance information of each of the display devices 210-1, 210-2, and 210-3 and identifying whether these devices are adjacent to one another based on a distance d between the second display device 210-2 and each of the display device 210-1 and the third display device 210-3 may be performed simultaneously (or in parallel). That is, the electronic apparatus 100 may identify whether the display devices are adjacent to one another simultaneously (or in parallel) based on the distance d between the second display device 210-2 and the first display device 210-1 at position −d and the third display device 210-3 at position +d, by using the second display device 210-2 as a reference (or origin).

Meanwhile, as described above, each of the display devices 210-1, 210-2, and 210-3 shown in FIG. 7A may correspond to the device in which the display modules having the size of 1×1 are merged. In this case, the electronic apparatus 100 may acquire the distance information of each display module (having the size of 1×1), then identify the distance between each module, and then identify whether the respective modules are adjacent to one another. Here, the electronic apparatus 100 may identify four display modules on the left as being adjacent to one another, and two display modules on the right as being adjacent to each other. Here, these two processes may be performed simultaneously, or may be performed separately over time. Accordingly, the electronic apparatus 100 may form a 2×2-sized first group (merged display devices) 210-1' in which the four modules are merged, and a second group (display device) 210-3 in which two modules are merged.

Hereinabove, the electronic apparatus 100 is described as an example in which the electronic apparatus 100 identifies whether the display devices 210-1, 210-2, and 210-3 are adjacent to one another, regardless of the arrangement order of the display devices 210-1, 210-2, and 210-3, is not necessarily limited thereto, and the electronic apparatus 100 may first identify whether the electronic apparatus 100 is adjacent to the first display device 210-1, or may first identify whether the electronic apparatus 100 is adjacent to the third display device 210-3, and then sequentially identify whether the display devices are adjacent to one another based on their arrangement order. For example, if three display devices 210-1, 210-2, and 210-3, each having the size of 1×2, form the display group 200, the electronic device may first identify the first display device 210-1 as being adjacent to the second display device 210-2 and perceive these devices as the merged 2×2-sized display device 210-1'. The electronic apparatus may then identify the merged display device 210-1' and the third display device 210-3 as being adjacent to each other, and then identify the merged 3×2-sized display device.

Here, the electronic apparatus 100 may identify the distance d by comparing the positions of the second communication modules of the adjacent display devices 210-1 and 210-2, and then identify whether these display devices are adjacent based on the above-described threshold range. Referring to FIGS. 7A to 7C, the second communication module may be disposed on each reference module (0,0). The electronic apparatus 100 may identify whether the display devices 210-1' and 210-3 are adjacent to each other by comparing the positions of the second communication modules included in the reference module (0,0) of the first merged display device 210-1' and the reference module (0,0) of the third display device 210-3 to secondly identify whether the display devices are adjacent to each other. FIG. 7B shows that the first merged display device 210-1' and the third display device 210-3 are identified as being spaced apart from each other. The electronic apparatus 100 may identify a distance 1 between the two display devices by comparing the position of the second communication module included in the reference module (0,0). The electronic apparatus 100 may then compare a width d of the reference module (0,0) included in the display device 210-1' with the distance 1. Here, if the distance 1 exceeds a threshold range having the width d as its reference value, the electronic apparatus 100 may identify the display device 210-1' as being spaced apart from the third display device 210-3.

FIG. 7C shows a case where a height difference between the reference modules (0,0) of the merged display device 210-1' and the third display device 210-3 exceeds the threshold range and the merged display device 210-1' and the third display device 210-3 are identified as spaced-apart screens. For example, the electronic apparatus 100 may compare the coordinates of the second communication modules respectively disposed on the reference modules (0,0) of a merged display device 210-1' and the third display device 210-3. Here, if the difference value for the z-component of each of the two coordinates exceeds the threshold range, the electronic apparatus 100 may identify the two display devices 210-1' and 210-3 as being spaced apart from each other.

That is, even though the merged display device 210-1' and the module included in the third display device 210-3 are positioned at the same height, if a difference between the reference modules (0,0) exceeds the threshold range as a result of comparing the reference modules, the electronic apparatus 100 may perceive the display devices as the spaced-apart display devices.

In the cases shown in FIGS. 7B and 7C, the electronic apparatus 100 may perceive that the display group 200 is disposed in a state where the merged 2×2-sized display device 210-1' and the third display device 210-3 are spaced apart from each other.

Accordingly, the electronic apparatus 100 may determine whether the plurality of display devices 210-1, 210-2, and 210-3 are merged based on whether the plurality of display devices 210-1, 210-2, and 210-3 are adjacent to or spaced apart from one another, and may provide the image corresponding thereto to each of the plurality of display devices 210-1, 210-2, and 210-3.

Meanwhile, the electronic apparatus 100 may identify whether the plurality of display devices 210-1, 210-2, and 210-3 are merged by identifying inclinations of the plurality of display devices 210-1, 210-2, and 210-3. For example, if each of the plurality of display devices 210-1, 210-2, and 210-3 includes at least one gyro sensor, the electronic apparatus 100 may perceive each inclination of the plurality of display devices 210-1, 210-2, and 210-3, and perceive that the adjacent display devices are merged if an inclination difference between the adjacent display devices is less than or equal to the threshold value. In this way, the electronic apparatus 100 may more precisely identify whether the adjacent display devices are merged.

Meanwhile, the electronic apparatus 100 may identify the position information of the plurality of display devices 210-1, 210-2, and 210-3 at the predetermined time intervals, and identify whether the display devices are merged. For example, the electronic apparatus 100 may maintain an operation of the merged display device 210-1' as it is if the position of the second display device 210-2 is modified while the merged plurality of display devices 210-1' is in operation and if a modified reference point (e.g., point where the second communication module is positioned) is positioned within the threshold range from the reference point of the first display device 210-1 (e.g., point where the second communication module is positioned).

On the other hand, if the modified reference point of the second display device 210-2 exceeds the threshold range, the electronic apparatus 100 may identify the two display devices 210-1 and 210-2 as being spaced apart from each other. In this case, the electronic apparatus 100 may provide an entire image signal to the first display device 210-1, and may provide no image signal to the second display device 210-2 or provide a separate image signal corresponding to the entire image. However, this configuration is only an example, and if the two display devices 210-1 and 210-2 are spaced apart from each other, the electronic apparatus 100 may provide the entire image signal only to the second display device 210-2.

Figure 8:
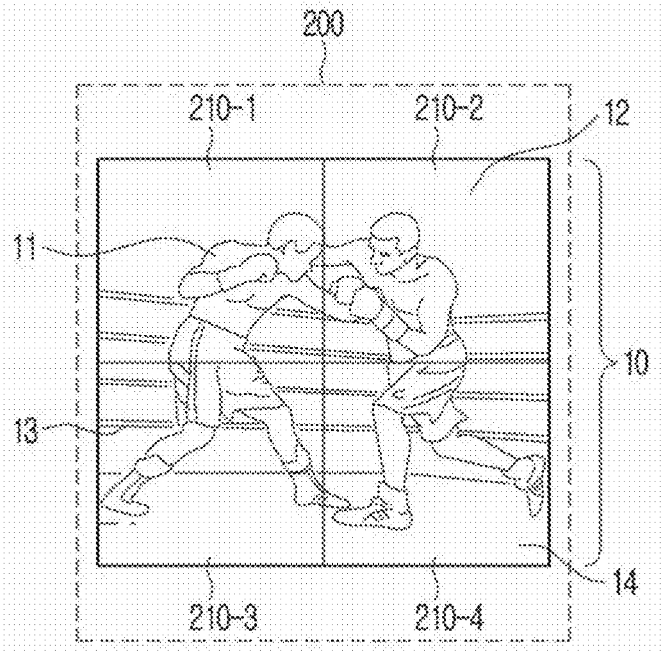
FIG. 8 is a diagram for describing an image according to one or more embodiments of the present disclosure.

FIG. 8 is a diagram for describing an image according to one or more embodiments of the present disclosure.

FIG. 8 shows the display group 200 including the plurality of display devices 210-1 to 210-4. The plurality of display devices 210-1 to 210-4 may respectively output partial images 11 to 14 respectively corresponding to the display devices 210-1 to 210-4. The partial images 11 to 14 may form one image 10.

According to one or more embodiments, the electronic apparatus 100 may store content including the image 10, and provide the image 10 and a signal corresponding to the image, along with the arrangement information, to the plurality of display devices 210-1 to 210-4.

For example, the electronic apparatus 100 may receive and store the content from the external device or the plurality of display devices 210-1 to 210-4. The content may include various information such as sound, image, video, and text. The external device is a device that provides the content and may be implemented as a set-top box, a smartphone, a TV, a PC, or a media box. If the electronic apparatus 100 receives the content from the plurality of display devices 210-1 to 210-4, at least one of the plurality of display devices 210-1 to 210-4 may be connected to the external content source to thus receive the content.

For example, the electronic apparatus 100 may provide the signal corresponding to the image 10 of the stored content and the acquired arrangement information to each of the display devices 210-1 to 210-4.

For example, each of the display devices 210-1 to 210-4 may receive the signal corresponding to the entire image 10. If each of the display devices 210-1 to 210-4 receives only the signal corresponding to the entire image 10, each of the display devices 210-1 to 210-4 may output the same image on each screen, rather than outputting a segmented image (or partial image) of the entire image 10.

For example, each of the display devices 210-1 to 210-4 may receive the arrangement information. Here, the arrangement information may include information on a relative arrangement relationship between each of the display devices 210-1 to 210-4. Here, the arrangement information may include at least one of the (first) position information of each of the display devices 210-1 to 210-4, the (second) position information of the second communication module, the coordinates of the second communication module, the difference value for each component of the coordinates of the plurality of second communication modules, or information indicating that whether the corresponding display apparatus is adjacent to the neighboring display device. Each of the display devices 210-1 to 210-4 may identify the partial images 11 to 14 to be output from the received entire image 10 based on the received arrangement information. Each of the display devices 210-1 to 210-4 may output the identified image.

In detail, the first display device 210-1 may output the first partial image 11, the second display device 210-2 may output the second partial image 12, the third display device 210-3 may output the third partial image 13, and the fourth display device 210-4 may output the fourth partial image 14.

Accordingly, the plurality of display devices 210-1 to 210-4 may receive the arrangement information along with the entire image, even if the display devices do not receive different partial images, respectively, and identify and output the corresponding partial images, respectively.

Meanwhile, according to one or more embodiments, the electronic apparatus 100 may identify the plurality of partial images 11 to 14 respectively corresponding to the plurality of display devices 210-1 to 210-4 from the image 10 based on the acquired arrangement information, and provide the signal corresponding to each of the plurality of partial images 11 to 14 to each of the plurality of display devices 210-1 to 210-4.

For example, the electronic apparatus 100 may segment the entire image 10 of the stored content based on the acquired arrangement information, and match the partial images 11 to 14 to the plurality of display devices 210-1 to 210-4, respectively. For example, the electronic apparatus 100 may identify based on the arrangement information that the first display device 210-1 is positioned at an upper left side, the second display device 210-2 is positioned at an upper right side, the third display device 210-3 is positioned at a lower left side, and the fourth display device 210-4 is positioned at a lower right side. Next, the electronic apparatus 100 may segment the entire image 10 into four parts, and match the first partial image 11 on the upper left side to the first display device 210-1, the second partial image 12 on the upper right side to the second display device 210-2, the third partial image 13 on the lower left side to the third display device 210-3, and the fourth partial image 14 on the lower right side to the fourth display device 210-4. Next, the electronic apparatus 100 may provide each of the matched partial images 11 to 14 to each of the plurality of display devices 210-1 to 210-4.

Meanwhile, according to one or more embodiments, the electronic apparatus 100 may identify the pixel pitch of each of the plurality of display devices based on the resolution information and size difference of each of the plurality of display devices. Here, the pixel pitch may indicate a distance from the center of one pixel in the display to the center of its adjacent pixel. The lower the pixel pitch of the display, the higher the resolution at which the image may be displayed.

For example, each of the plurality of display devices 210-1 to 210-4 may have a different pixel pitch depending on the number of arranged LED elements, even if the size information is the same. Here, if the plurality of display devices 210-1 to 210-4 each output the partial images 11 to 14, the completeness of the entire image 10 may be reduced, and the user may feel visual discomfort while viewing the image 10.

According to one or more embodiments, the electronic apparatus 100 may identify each of the plurality of display devices 210-1 to 210-4 as having the different pixel pitch. For example, the electronic apparatus 100 may compare the pixel pitches of the plurality of display devices 210-1 to 210-4 based on the identification (ID) information (device identification information or product information) of each of the plurality of display devices 210-1 to 210-4. Here, the electronic apparatus 100 may receive and store the ID information from each of the plurality of display devices 210-1 to 210-4.

According to one or more embodiments, if the pixel pitches are identified as being different from each other, the electronic apparatus 100 may downsample the remaining partial images, excluding a partial image corresponding to the display device having the maximum pixel pitch, among the plurality of partial images 11 to 14, based on the pixel pitch difference. The electronic apparatus 100 may then provide the downsampled partial image and remaining partial images to the plurality of display devices 210-1 to 210-4. Here, downsampling may indicate converting the high-resolution image or video to a lower-resolution image or video.

That is, an image corresponding to the display device having a relatively low pixel pitch may be downsample d to output the partial images 11 to 14 having an overall identical or similar resolution, thereby improving the completeness of the image 10 and reducing visual fatigue or discomfort felt by the user.

Meanwhile, the electronic apparatus 100 may compensate for the partial images 11 to 14 based on the pixel pitch difference of each of the plurality of display devices 210-1 to 210-4, as well as a screen size, a screen ratio or the like. For example, if each of the plurality of display devices 210-1 to 210-4 has a different aspect ratio (e.g., 16:9 or 4:3), the electronic apparatus 100 may compensate for the aspect ratio of the partial image corresponding to some of the display devices. In this way, the plurality of display devices 210-1 to 210-4 may transmit the image having a sense of unity overall, thereby increasing user satisfaction.

Meanwhile, each of the plurality of display devices 210-1 to 210-4 described above may correspond to the display device having the same size, or may correspond to the display device in which the several display devices, each having the basic size, are combined with each other.

Figure 9:
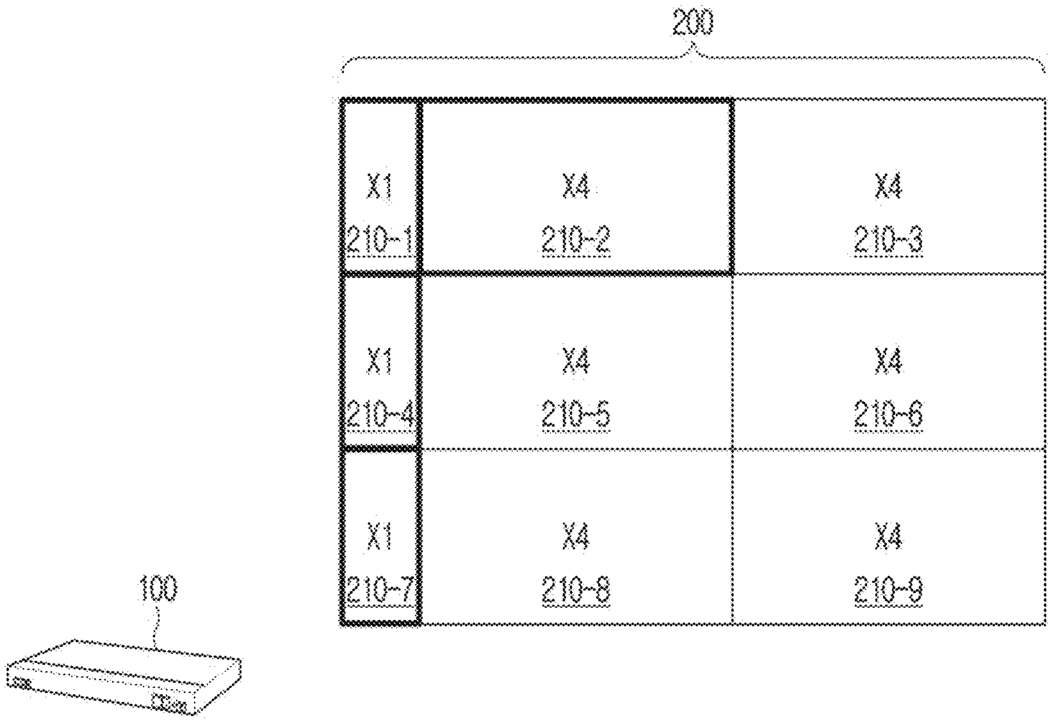
FIG. 9 is a diagram for describing the plurality of display devices according to one or more embodiments of the present disclosure.

FIG. 9 is a diagram for describing the plurality of display devices according to one or more embodiments of the present disclosure.

Referring to FIG. 9, the display group 200 may include a plurality of display devices 210-1 to 210-9. The plurality of display devices 210-1 to 210-9 may include three display devices 210-1, 210-4, and 210-7, each having a basic size X1 and six display devices 210-2, 210-3, 210-5, 210-6, 210-8, and 210-9, each having a quadruple size X4. Here, the display devices 210-2, 210-3, 210-5, 210-6, 210-8, and 210-9, each having the quadruple size, may correspond to the display devices manufactured by combining several display devices, each having the basic size.

For example, if each of the existing display devices 210-2, 210-3, 210-5, 210-6, 210-8, and 210-9, having the quadruple size, is implemented as a 4K display device, the display group may output the image having an 8K resolution. Here, if a 9K image is to be played through the display group 200, 1K display devices 210-1, 210-4, and 210-7, each having a size of 1× may be additionally combined therewith.

Here, the electronic apparatus 100 may acquire the arrangement information of the plurality of display devices 210-1 to 210-9 at the predetermined time intervals, and as described above, if the 1K display devices 210-1, 210-4, and 210-7 are combined with the existing 4K display devices 210-2, 210-3, 210-5, 210-6, 210-8, and 210-9, the electronic apparatus 100 may acquire the arrangement information of the entire plurality of display devices 210-1 to 210-9. Here, the arrangement information may include information indicating that the 4K display devices 210-2, 210-3, 210-5, 210-6, 210-8, and 210-9 are arranged in a 2×3 layout on the right side, and the 1K display devices 210-1, 210-4, and 210-7 are arranged in a 1×3 layout on the left side.

Accordingly, the display group 200 may be implemented in various forms and arrangement based on the purpose, and the electronic apparatus 100 may automatically detect that the display device included in the existing display group is connected to the display device different therefrom and update the arrangement information, thereby increasing the satisfaction of the user configuring the display group 200 in the various forms.

Meanwhile, in addition to the case where the plurality of display devices 210-1 to 210-9 are arranged to be adjacent to one another as in the above-described example, i.e., spaced apart from one another, the electronic apparatus 100 may provide the image based on the arrangement information to the plurality of display devices 210-1 to 210-9.

FIGS. 10A to 10C and 11 are diagrams for describing the spaced-apart display devices according to one or more embodiments of the present disclosure.

Figure 10A:
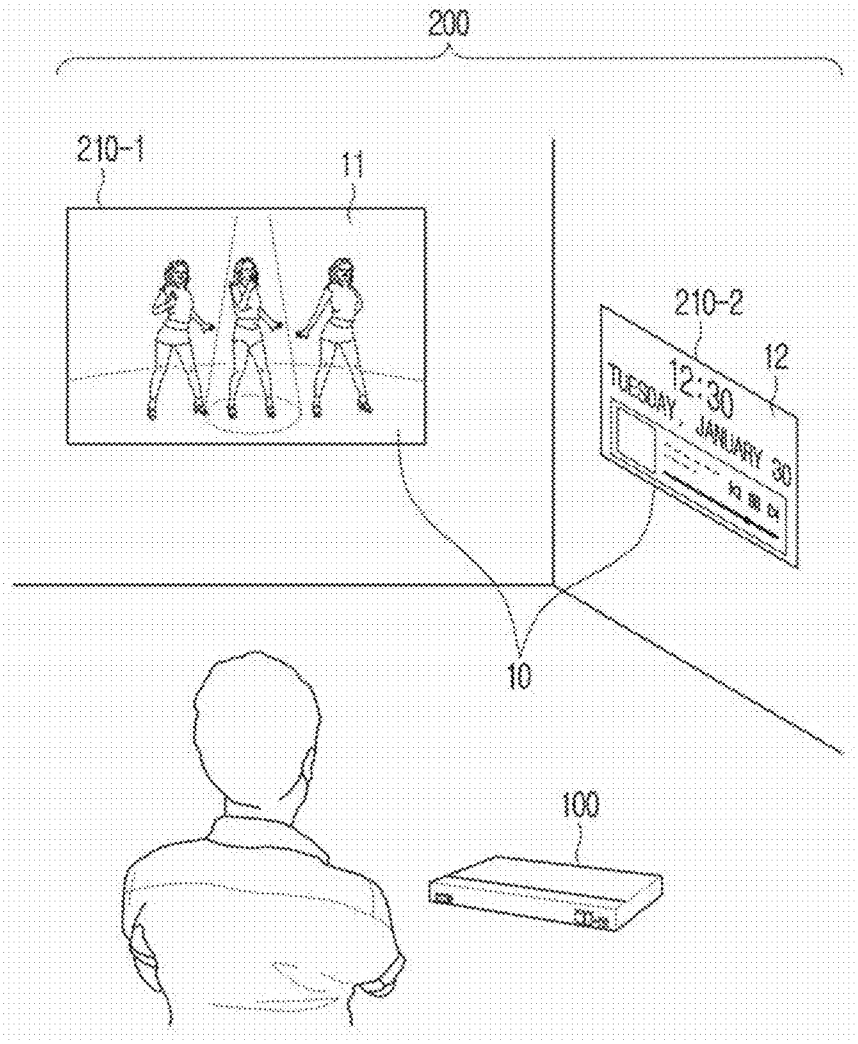
FIG. 10A is a diagram for describing the spaced-apart display devices according to one or more embodiments of the present disclosure.

Referring to FIG. 10A, two spaced-apart display devices 210-1 and 210-2 may play the partial images 11 and 12. For example, the first display device 210-1 may play a music video, and the second display device 210-2 may output a screen showing album information and other user interface (UI) corresponding to the music video. Here, the first display device 210-1 may be referred to as a main module, and the second display device 210-2 may be referred to as a sub module. In this case, only the main module may output the video, and the sub module may output a still image (e.g., UI) related thereto.

The above-described example may be only an example, and a plurality of various other partial images may be displayed through the first display device 210-1 and the second display device 210-2, and the like such as the first display device 210-1 displaying record tracks, and the second display device 210-2 displaying the screen which shows playback information and other UI for the currently playing music among the record tracks.

Here, the partial images 11 and 12 may respectively correspond to the images acquired from the electronic apparatus 100 and the external content source.

For example, the partial images 11 and 12 may respectively correspond to the images provided to the first display device 210-1 and the second display device 210-2 separately by segmenting the entire image into the partial images 11 and 12. For example, each of the first display device 210-1 and the second display device 210-2 may receive the entire image including the partial images 11 and 12 from the electronic apparatus along with the arrangement information, and may play the corresponding partial image among the received entire images. For example, each of the first display device 210-1 and the second display device 210-2 may play each of the partial images 11 and 12 of the content received from the separate content source device, based on the arrangement information provided from the electronic apparatus 100.

Figure 10B:
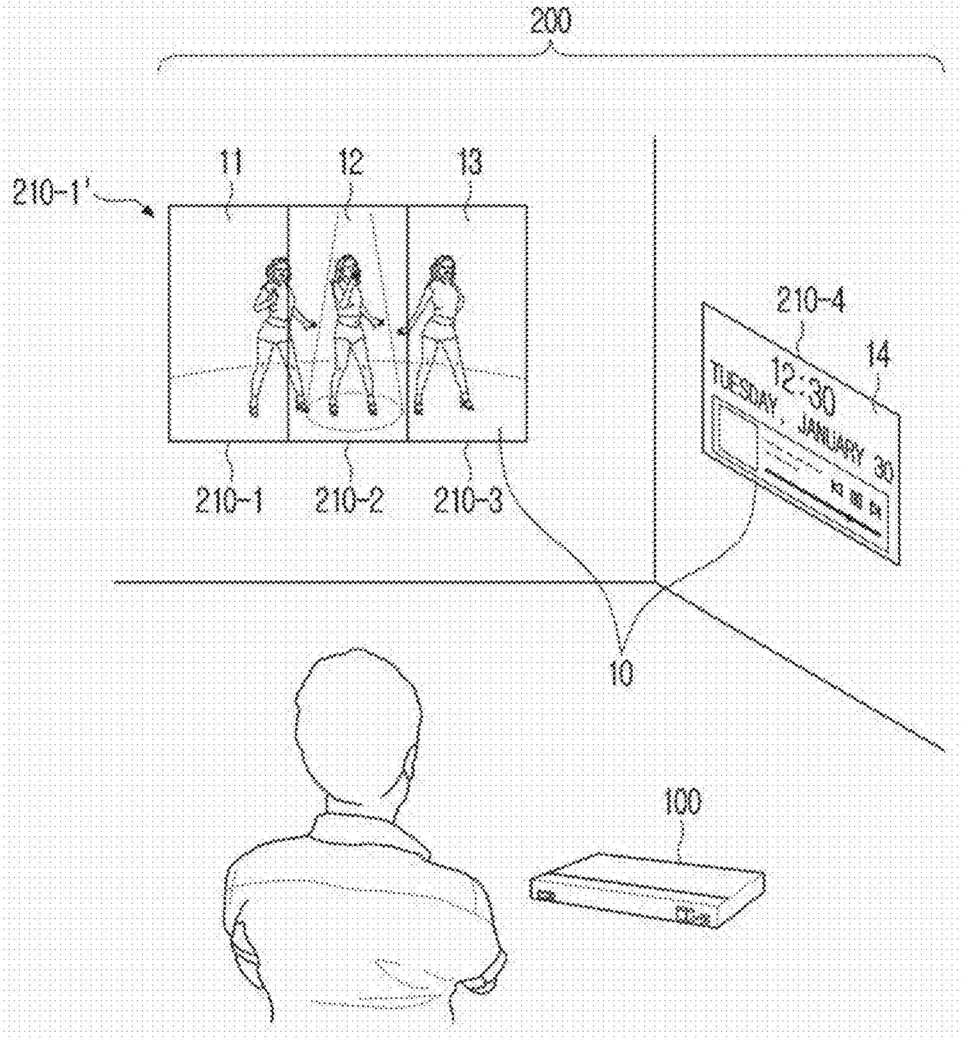
FIG. 10B is a diagram for describing the spaced-apart display devices according to one or more embodiments of the present disclosure.

Meanwhile, referring to FIG. 10B, the display device 210-1' that plays the music video described above may be the merged display device 210-1' including the plurality of adjacent display devices (i.e., first display device 210-1, second display device 210-2, and third display device 210-3). Here, the first to fourth display devices 210-1 to 210-4 may play the partial images 11, 12, 13, and 14, respectively.

For example, the electronic apparatus 100 may provide the partial images 11 to 13 to the first display device 210-1 to the third display device 210-3, which are identified as being adjacent to one another, and may provide the partial image 14 to the fourth display device 210-4, which is identified as being spaced apart from the first display device 210-1 to the third display device 210-3.

Figure 10C:
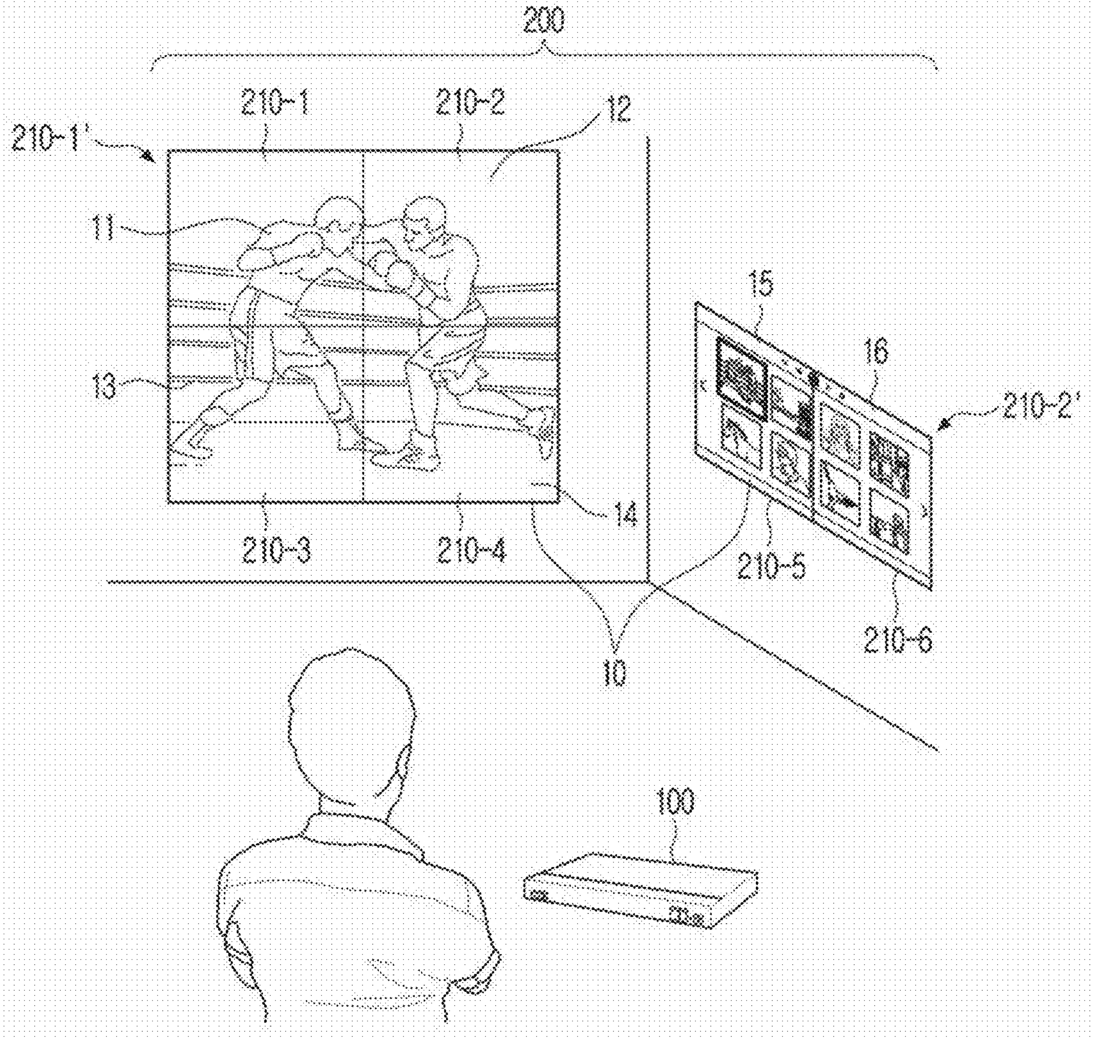
FIG. 10C is a diagram for describing the spaced-apart display devices according to one or more embodiments of the present disclosure.

Meanwhile, referring to FIG. 10C, each merged display device 210-1' and 210-2' may be spaced apart from each other and may play each of partial images 11 to 16. The first merged display device 210-1' may include the first to fourth display devices 210-1 to 210-4, which are identified as being adjacent to one another, and the second merged display device 210-2' may include the fifth display device 210-5 and the sixth display device 210-6, which are identified as being adjacent to each other. The first display device 210-1 to the fourth display device 210-4 included in the first merged display device 210-1' may all be identified as being spaced apart from the fifth display device 210-5 and the sixth display device 210-6 included in the second merged display device 210-2'.

For example, the electronic apparatus 100 may identify the arrangement information of the first display device to the sixth display device 210-1 to 210-6 as described above, and provide the partial images 11 to 14 of the entire image 10 to the first display device to the fourth display device 210-1 to 210-4 included in the first merged display device 210-1', respectively, and provide partial images 15 and 16 of the entire image 10 to the fifth display device 210-5 and the sixth display device 210-6 included in the second merged display device 210-2', respectively.

Figure 11:
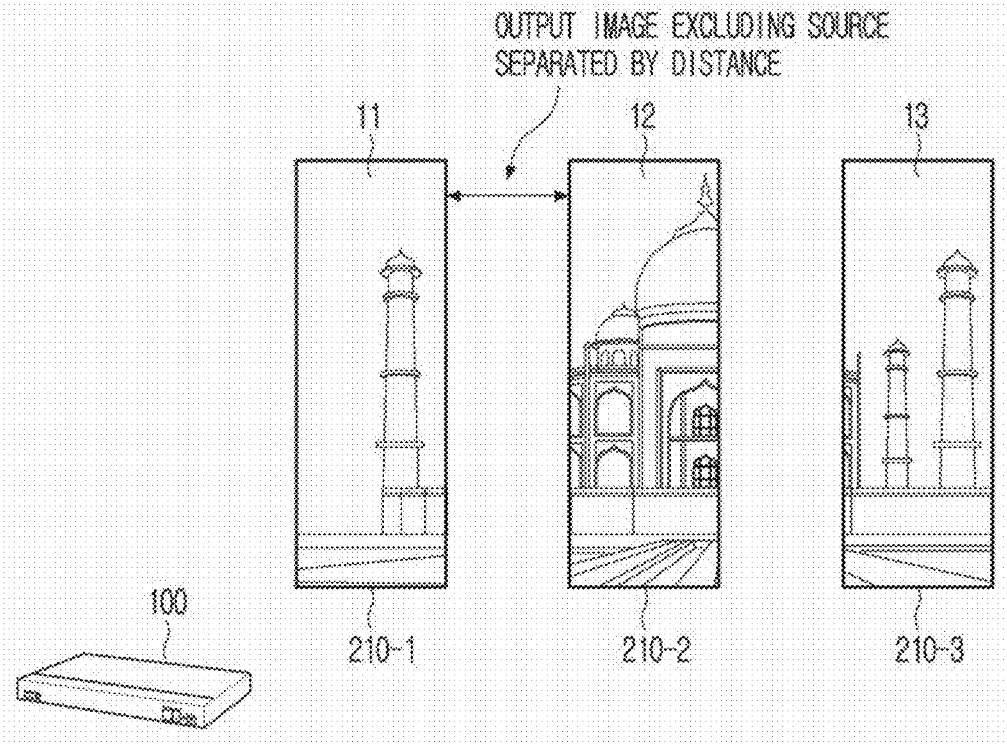
FIG. 11 is a diagram for describing the spaced-apart display devices according to one or more embodiments of the present disclosure.

FIG. 11 is a diagram for describing the spaced-apart display devices according to one or more embodiments of the present disclosure.

Referring to FIG. 11, the first display device 210-1, the second display device 210-2, and the third display device 210-3 may output the partial images 11, 12, and 13, respectively. Here, each of the partial images 11, 12, and 13 may be implemented in a form where a portion of the entire image is removed.

For example, the electronic apparatus 100 may acquire the arrangement information of the plurality of display devices 210-1 to 210-3. Based on this arrangement information, the electronic apparatus 100 may identify the partial images 11, 12, and 13 to be output respectively by the display devices 210-1 to 210-3 based on distances by which the plurality of display devices 210-1 to 210-3 are spaced apart from one another. That is, the electronic apparatus 100 may perceive the gap and provide the partial image 11, 12, or 13, excluding an image separated by the gap, to each of the display devices 210-1 to 210-3.

For example, each of the plurality of display devices 210-1 to 210-3 may receive the entire image including each of the partial images 11, 12, and 13 from the electronic apparatus 100 along with the arrangement information, and may play a corresponding partial image, excluding a region separated by the distance from one another in the received entire image.

For example, each of the plurality of display devices 210-1 to 210-3 may play the partial image 11, 12, or 13 of the content received from the separate content source device based on the arrangement information provided by the electronic apparatus 100.

Each of the partial images 11, 12, and 13 may be implemented in the form where a part of the entire image is removed. A pixel value of the part of the image to be excluded here may be calculated as "(screen distance apart)/(pixel pitch of a screen module)".

Accordingly, as shown in FIGS. 10A to 10C and 11, if the plurality of display devices 210-1 to 210-3 are spaced apart from one another, respectively, the partial images 11 to 13, identified based on the arrangement information acquired by the electronic apparatus 100, may be output, thereby providing various content viewing experiences to the user based on the configuration of the display group 200.

Figure 12:
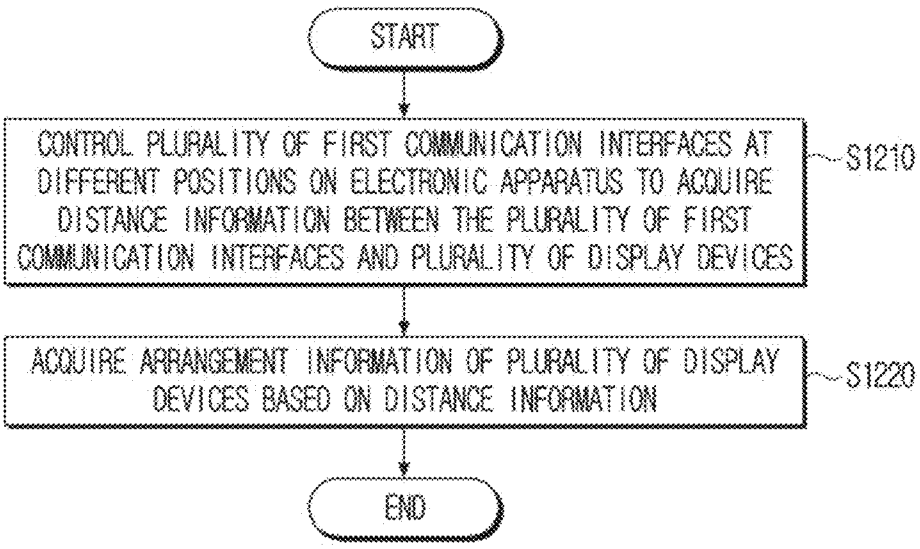
FIG. 12 is a flowchart for describing a method for controlling an electronic apparatus capable of communicating with the plurality of display devices according to one or more embodiments of the present disclosure.

FIG. 12 is a flowchart for describing a method for controlling an electronic apparatus capable of communicating with the plurality of display devices according to one or more embodiments of the present disclosure.

Referring to FIG. 12, the electronic apparatus 100 may control the plurality of communication modules to acquire the distance information between the plurality of communication modules disposed at different positions on the electronic apparatus and the plurality of display devices (S1210).

According to one or more embodiments, the electronic apparatus 100 may control the plurality of first communication modules to acquire the distance information between the plurality of first communication modules and the plurality of second communication modules respectively included in the plurality of display devices.

According to one or more embodiments, the position information may include the coordinate values of the plurality of components, and the coordinate values of the plurality of components may be the values calculated based on the acquired distance information.

Next, the electronic apparatus 100 may acquire the arrangement information of the plurality of display devices within the display group based on the acquired distance information (S1220).

According to one or more embodiments, the electronic apparatus 100 may acquire the position information of each of the plurality of display devices within the display group based on the acquired distance information.

According to one or more embodiments, the electronic apparatus 100 may acquire the position information of each of the plurality of second communication modules based on the acquired distance information.

Next, the electronic apparatus 100 may provide the acquired arrangement information to each of the plurality of display devices. The electronic apparatus 100 may provide the signal corresponding to the image, along with the acquired arrangement information, to each of the plurality of display devices.

According to one or more embodiments, the electronic apparatus 100 may identify the plurality of partial images respectively corresponding to the plurality of display devices, and provide the signal corresponding to each of the plurality of partial images to each of the plurality of display devices.

In this way, the electronic apparatus 100 may remotely acquire the arrangement information of each of the display devices, and each of the display devices may output the content in various aspects based on the arrangement information, thereby providing the user with a spatial experience based on an actual position.

The various methods described with reference to FIG. 12 may be performed by the electronic apparatus having the configuration shown in FIG. 2, are not necessarily limited thereto, and may be performed by the electronic apparatus having various configurations.

Meanwhile, FIG. 12 shows that the order is mapped for all the steps for the convenience of description. However, the order of steps not related to the order or capable of being performed in parallel is not necessarily limited to the corresponding order.

Embodiments of the method and device described herein improve the functioning of a computer by enabling control of a plurality of displays to display an image based on positions of the displays. These problems of control of a plurality of displays to display an image based on positions of the displays are present in the realm of computation and networks. Thus, embodiments herein are rooted in computer technology to overcome a problem arising in the realm of computer networks.

Meanwhile, the methods according to at least some of the one or more embodiments of the present disclosure described above may be implemented in the form of an application which may be installed on an existing electronic device.

In addition, the methods according to at least some of the one or more embodiments of the present disclosure described above may be implemented only by software upgrade or hardware upgrade of the existing electronic device.

In addition, the one or more embodiments of the present disclosure described above may be performed through an embedded server included in the electronic device, or at least one external server of the electronic device.

Meanwhile, according to one or more embodiments of the present disclosure, the one or more embodiments described above may be implemented in software including an instruction stored on a machine-readable storage medium (for example, a computer-readable storage medium). A machine may be a apparatus that invokes the stored instruction from a storage medium, may be operated based on the invoked instruction, and may include the electronic apparatus (e.g., electronic apparatus A) according to the disclosed embodiments. If the instruction is executed by the processor, the processor may directly perform a function corresponding to the instruction or other components may perform the function corresponding to the instruction under the control of the processor. The instruction may include a code generated or executed by a compiler or an interpreter. The machine-readable storage medium may be provided in the form of a non-transitory storage medium. Here, the "non-transitory storage medium" is a tangible apparatus and may only indicate that this storage medium does not include a signal (e.g., electromagnetic wave), and this term does not distinguish a case where data is stored semi-permanently on the storage medium and a case where data is temporarily stored on the storage medium from each other. For example, the "non-transitory storage medium" may include a buffer in which data is temporarily stored. According to one or more embodiments, the methods according to the one or more embodiments disclosed in this document may be included and provided in a computer program product. The computer program product may be traded as a commodity between a seller and a purchaser. The computer program product may be distributed in the form of the machine-readable storage medium (for example, a compact disc read only memory (CD-ROM)), or may be distributed online (for example, downloaded or uploaded) through an application store (for example, PlayStore™) or directly between two user devices (for example, smartphones). In case of the online distribution, at least a portion of the computer program product (e.g., downloadable application) may be at least temporarily stored on the machine-readable storage medium such as the memory of a server of a manufacturer, a server of an application store or a relay server, or be temporarily generated.

The one or more embodiments of the present disclosure may be implemented in software including an instruction stored on the machine-readable storage medium (e.g., computer-readable storage medium). The machine may be a apparatus that invokes the stored instruction from the storage medium, may be operated based on the invoked instruction, and may include the electronic apparatus (e.g., electronic apparatus 100) according to the disclosed embodiments.

If the instruction is executed by the processor, the processor may directly perform the function corresponding to the instruction or other components may perform the function corresponding to the instruction under the control of the processor. The instruction may include the code generated or executed by the compiler or the interpreter.

Although the embodiments are shown and described in the present disclosure as above, the present disclosure is not limited to the above-described specific embodiments, and may be variously modified by those skilled in the art to which the present disclosure pertains without departing from the gist of the present disclosure as claimed in the accompanying claims. These modifications should also be understood to fall within the scope and spirit of the present disclosure.

What is claimed is:

1. An electronic apparatus configured to communicate with a plurality of display devices, the electronic apparatus comprising:

a communication device comprising a plurality of first communication interfaces at different positions on the electronic apparatus;

memory storing at least one instruction; and at least one processor configured to execute the at least one instruction, wherein the at least one instruction, when executed by the at least one processor individually or collectively, causes the electronic apparatus to:

control the plurality of first communication interfaces to acquire distance information between the plurality of first communication interfaces and the plurality of display devices; and acquire position information of the plurality of display devices based on the distance information with respect to a reference position, and wherein the at least one instruction, when executed by the at least one processor individually or collectively, causes the electronic apparatus to set the reference position based on the different positions of the plurality of first communication interfaces.

2. The electronic apparatus as claimed in claim 1, wherein the at least one instruction, when executed by the at least one processor individually or collectively, causes the electronic apparatus to:

control the plurality of first communication interfaces to acquire distance information between the plurality of first communication interfaces and a plurality of second communication interfaces respectively in the plurality of display devices; and acquire position information of the plurality of second communication interfaces based on the distance information.

3. The electronic apparatus as claimed in claim 2, wherein the position information comprises coordinate values, and wherein the at least one instruction, when executed by the at least one processor individually or collectively, causes the electronic apparatus to:

calculate the coordinate values based on the distance information; and acquire difference values of the coordinate values by comparing the coordinate values.

4. The electronic apparatus as claimed in claim 3, wherein the memory further stores mount information comprising positions of the plurality of second communication interfaces in the plurality of display devices, and wherein the at least one instruction, when executed by the at least one processor individually or collectively, causes the electronic apparatus to acquire whether the plurality of display devices are adjacent to or spaced apart from at least one neighboring display device based on the mount information and the difference values.

5. The electronic apparatus as claimed in claim 4, wherein the memory further stores size information of the plurality of display devices, and wherein the at least one instruction, when executed by the at least one processor individually or collectively, causes the electronic apparatus to acquire whether the plurality of display devices is adjacent to or spaced apart from the at least one neighboring display device based on the mount information, the size information, and the difference values.

6. The electronic apparatus as claimed in claim 1, wherein the at least one instruction, when executed by the at least one processor individually or collectively, causes the electronic apparatus to provide the position information to the plurality of display devices via the communication device.

7. The electronic apparatus as claimed in claim 1, wherein the memory further stores content comprising an image, and wherein the at least one instruction, when executed by the at least one processor individually or collectively, causes the electronic apparatus to provide a signal corresponding to the image, along with the position information, to the plurality of display devices.

8. The electronic apparatus as claimed in claim 1, wherein the memory further stores an image, and wherein the at least one instruction, when executed by the at least one processor individually or collectively, causes the electronic apparatus to:

identify a plurality of partial images respectively corresponding to the plurality of display devices from the image based on the position information; and provide signals corresponding to the plurality of partial images to the plurality of display devices via the communication device.

9. The electronic apparatus as claimed in claim 8, wherein the memory further stores resolution information and size information of the plurality of display devices, and wherein the at least one instruction, when executed by the at least one processor individually or collectively, causes the electronic apparatus to:

identify pixel pitches of the plurality of display devices based on the resolution information and the size information of the plurality of display devices;

downsample remaining partial images, excluding a partial image corresponding to a display device having a maximum pixel pitch, among the plurality of partial images, based on a pixel pitch difference of the pixel pitches; and provide the downsampled partial image and remaining partial images to the plurality of display devices, respectively.

10. A method of controlling an electronic apparatus configured to communicate with a plurality of display devices, the method comprising:

controlling a plurality of first communication interfaces at different positions on the electronic apparatus to acquire distance information between the plurality of first communication interfaces and the plurality of display devices; and acquiring position information of the plurality of display devices based on the distance information with respect to a reference position, wherein the method further comprises setting the reference position based on the different positions of the plurality of first communication interfaces.

11. The method as claimed in claim 10, in which the electronic apparatus includes the plurality of first communication interfaces at the different positions on the electronic apparatus, wherein the controlling of the plurality of first communication interfaces comprises controlling the plurality of first communication interfaces to acquire distance information between the plurality of first communication interfaces and a plurality of second communication interfaces respectively included in the plurality of display devices, and wherein the acquiring the position information comprises acquiring the position information of the plurality of second communication interfaces based on the distance information.

12. The method as claimed in claim 11, wherein the position information comprises coordinate values, wherein the acquiring the position information of the plurality of second communication interfaces comprises:

calculating the coordinate values based on the distance information; and acquiring difference values of the coordinate values by comparing the coordinate values.

13. The method as claimed in claim 12, wherein the acquiring the position information of the plurality of second communication interfaces comprises acquiring whether the plurality of display devices are adjacent to or spaced apart from at least one neighboring display device based on mount information comprising positions of the plurality of second communication interfaces in the plurality of display devices, and the difference values.

14. The method as claimed in claim 13, wherein the acquiring whether the plurality of display devices are adjacent to or spaced apart from at least one neighboring display device comprises acquiring whether the plurality of display devices is adjacent to or spaced apart from the at least one neighboring display device based on the mount information, size information of the plurality of display devices, and the difference values.

15. The method as claimed in claim 10, further comprising:

providing the position information to the plurality of display devices.

16. The method as claimed in claim 10, further comprising:

providing a signal corresponding to an image, along with the position information, to the plurality of display devices.

17. The method as claimed in claim 10, further comprising:

identifying a plurality of partial images respectively corresponding to the plurality of display devices from an image based on the position information; and providing signals corresponding to the plurality of partial images to the plurality of display devices.

18. The method as claimed in claim 17, wherein the providing signals corresponding to the plurality of partial images to the plurality of display devices comprises:

identifying pixel pitches of the plurality of display devices based on resolution information and size information of the plurality of display devices;

downsampling remaining partial images, excluding a partial image corresponding to a display device having a maximum pixel pitch, among the plurality of partial images, based on a pixel pitch difference of the pixel pitches; and providing the downsampled partial image and remaining partial images to the plurality of display devices, respectively.

* * * * *